(12) United States Patent
Benson et al.

(10) Patent No.: US 10,606,577 B1
(45) Date of Patent: Mar. 31, 2020

(54) SYSTEM AND METHOD FOR ASSURING CUSTOMERS DURING SOFTWARE DEPLOYMENT

(71) Applicant: TriZetto Corporation, Denver, CO (US)

(72) Inventors: William L. Benson, Aurora, CO (US); Stuart R. Backer, Centennial, CO (US); Ryan R. McBurney, Aurora, CO (US)

(73) Assignee: Cognizant TriZetto Software Group, Inc., Englewood, CO (US)

( * ) Notice: Subject to any disclaimer, the term of this patent is extended or adjusted under 35 U.S.C. 154(b) by 0 days.

(21) Appl. No.: 15/345,043

(22) Filed: Nov. 7, 2016

Related U.S. Application Data

(60) Provisional application No. 62/251,315, filed on Nov. 5, 2015.

(51) Int. Cl.
*G06F 8/61* (2018.01)
*H04L 29/08* (2006.01)

(52) U.S. Cl.
CPC ............ *G06F 8/61* (2013.01); *H04L 67/1097* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,966,715 A | * | 10/1999 | Sweeney ............... G06F 21/604 |
| 6,618,735 B1 | * | 9/2003 | Krishnaswami .......... G06F 8/65 |
| 6,735,766 B1 | | 5/2004 | Chamberlain et al. ....... 717/173 |

(Continued)

FOREIGN PATENT DOCUMENTS

WO    WO2001001255 A9 * 12/2000

OTHER PUBLICATIONS

Desmand, "Getting Total Installed Memory with WMI", 2014, Published at https://www.briandesmond.com/windows-server/getting-total-installed-memory-with-wmi/.*

(Continued)

*Primary Examiner* — Hossain M Morshed
(74) *Attorney, Agent, or Firm* — Dawn-Marie Bey; Bey & Cotropia PLLC

(57) ABSTRACT

Deployment assurance services Accelerators ("DAS Accelerators") include audit functionality that performs a sequential audit of each server listed in a customer's server list from customer's target environment. And artificial intelligence engine ("AI engine") scans each server to match all required Include entries, which enables categories of product specific checks. Checks for each product category are processed sequentially, including database specific checks. All database platforms can be configured to connect on custom\nonstandard ports, using unique credentials. After each server audit is completed, the audit results are outputted to an encrypted file, a csv or database, depending on how the execution was configured by the customer. Audits review hardware, software, registry, integration and configuration details from customer servers for, e.g., the purpose of validating fitness for use. Various validation and environment reports are generated based on the audit results.

12 Claims, 24 Drawing Sheets

(56) References Cited

U.S. PATENT DOCUMENTS

| | | | | |
|---|---|---|---|---|
| 7,536,599 | B2* | 5/2009 | Paliwal | G06F 11/2247 714/15 |
| 7,624,086 | B2* | 11/2009 | Keith, Jr. | G06N 5/04 706/60 |
| 8,763,076 | B1* | 6/2014 | Satish | G06F 21/00 713/166 |
| 8,799,436 | B2* | 8/2014 | Ayachitula | G06F 21/73 707/609 |
| 8,959,107 | B2* | 2/2015 | Bailey, Jr. | G06F 11/3409 707/769 |
| 9,081,747 | B1* | 7/2015 | Tabieros | G06F 9/4411 |
| 9,152,386 | B1* | 10/2015 | Rojas | G06F 8/65 |
| 9,503,351 | B1* | 11/2016 | Gabrielson | H04L 41/28 |
| 9,699,213 | B2* | 7/2017 | Nagaratnam | G06F 21/57 |
| 2003/0051015 | A1 | 3/2003 | Brown et al. | 709/222 |
| 2003/0105732 | A1* | 6/2003 | Kagalwala | G06F 16/211 |
| 2005/0257214 | A1 | 11/2005 | Moshir et al. | 717/171 |
| 2006/0123040 | A1* | 6/2006 | McCarthy | G06F 8/61 |
| 2006/0161895 | A1* | 7/2006 | Speeter | G06F 8/71 717/121 |
| 2010/0058313 | A1 | 3/2010 | Hansmann et al. | 717/168 |
| 2011/0219111 | A1* | 9/2011 | Shevenell | G06F 15/173 709/224 |
| 2012/0158602 | A1* | 6/2012 | Dolan | G06Q 30/018 705/317 |
| 2013/0067440 | A1* | 3/2013 | Tendulkar | G06F 16/21 717/134 |
| 2013/0074061 | A1 | 3/2013 | Averbuch et al. | 717/171 |
| 2013/0212298 | A1* | 8/2013 | Bunch | H04L 45/42 709/244 |
| 2013/0247136 | A1* | 9/2013 | Chieu | G06F 21/577 726/1 |
| 2013/0290511 | A1* | 10/2013 | Tu | G06F 9/5072 709/224 |
| 2014/0337830 | A1* | 11/2014 | Schwaninger | G06F 8/61 717/177 |
| 2015/0229518 | A1* | 8/2015 | Ennis | H04L 41/0806 709/224 |
| 2015/0365351 | A1* | 12/2015 | Suit | G06F 9/45558 709/226 |
| 2017/0041347 | A1* | 2/2017 | Nagaratnam | H04L 63/20 |
| 2017/0140154 | A1* | 5/2017 | Carpenter | G06F 21/577 |

OTHER PUBLICATIONS

Smith, "book title: The Definitive Guide to Samba 3", 2004, Publisher: Apress, ISBN: 9781430206835.*

Hicks, "Command Line WMI: Basic Syntax and Querying", 2012, Published at: https://www.codeproject.com/Articles/46390/WMI-Query-Language-by-Example.*

Calakovic, "WMI Query Language by Example", 2009, Published at: https://www.codeproject.com/Articles/46390/WMI-Query-Language-by-Example.*

ScriptingGuy1, "How Can I Determine if a File Exists and, if It Does, Exit the Script?", 2005, Published at https://blogs.technet.microsoft.com/heyscriptingguy/2005/06/20/how-can-i-determine-if-a-file-exists-and-if-it-does-exit-the-script/.*

Smith, "The Definitive Guide to Samba 3", 2004, Books.google.com/books?isbn=1590592778 (Year: 2004).*

* cited by examiner

| Server | Environment | Product | Type | Role | Version | Check_Type | Check_Category | Check_Value | Results |
|---|---|---|---|---|---|---|---|---|---|
| NON-SAM-APP-D01.cust.domain.net | Region1/DEV | ALL | ALL | ALL | ALL | RegKey | 11_VirtualOrPhysical | SystemManufacturer | VMware, Inc. |
| NON-SAM-SQL-T01.cust.domain.net | Region0/BRC | ALL | ALL | ALL | ALL | RegKey | 11_VirtualOrPhysical | SystemManufacturer | HP |
| NON-SAM-APP-D01.cust.domain.net | Region1/DEV | ALL | ALL | ALL | ALL | RegKeyCount | 12_CPU_count | Count | 2 |
| NON-SAM-APP-D01.cust.domain.net | Region1/DEV | ALL | ALL | ALL | ALL | Memory | 13_Memory | | Total |
| NON-SAM-APP-D01.cust.domain.net | Region1/DEV | ALL | ALL | ALL | ALL | Disk Info | 14_Disk Info | C: | Free Space |
| NON-SAM-APP-D01.cust.domain.net | Region1/DEV | ALL | ALL | ALL | ALL | RegKey | 15_BindOrder | Bind | 1 |
| NON-SAM-APP-D01.cust.domain.net | Region0/BRC | ALL | ALL | ALL | ALL | RegKey | 19_OS | CurrentVersion | 6.1 |
| NON-SAM-APP-D01.cust.domain.net | Region1/DEV | ALL | ALL | ALL | ALL | RegKey | 19_OS | EnableLUA | Key Not Found |
| NON-SAM-APP-D01.cust.domain.net | Region2/PPMO | ALL | ALL | ALL | ALL | RegKey | 19_OS | FullInstallVer | 6.1.7601.17514 |
| NON-SAM-XEN-T01.cust.domain.net | Region1/DEV | ALL | ALL | ALL | ALL | RegKey | 19_OS | Hostname | NON-SAM-XEN-T01 |
| NON-SAM-APP-T03.cust.domain.net | Region1/DEV | ALL | ALL | ALL | ALL | SubRegKey | 19_OS | IPAddress | 10.1.2.54 |
| NON-SAM-APP-D01.cust.domain.net | Region1/DEV | ALL | ALL | ALL | ALL | RegKey | 19_OS | LocalAccountTokenFilterPolicy | Key Not Found |
| NON-SAM-APP-T03.cust.domain.net | Region1/DEV | ALL | ALL | ALL | ALL | RegKey | 19_OS | PROCESSOR_ARCHITECTURE | AMD64 |
| NON-SAM-APP-T01.cust.domain.net | Region0/BRC | ALL | ALL | ALL | ALL | RegKey | 19_OS | ProductName | Windows Server 2008 R2 Standard |
| NON-SAM-APP-D01.cust.domain.net | Region1/DEV | ALL | ALL | ALL | ALL | RegKey | 19_OS | Version | 6.1.7601.17514 |
| NON-SAM-SQL-T01.cust.domain.net | Region0/BRC | ALL | ALL | ALL | ALL | Exist | Claimcheck | | No File Exists on any searched drives |
| PRO-SAM-APP-08.cust.domain.net | Region3/PROD | ALL | ALL | ALL | ALL | Connectivity | Connectivity | 443 | Failed |
| NON-SAM-APP-T04.cust.domain.net | Region2/PPMO | ALL | ALL | ALL | Connectiv | Connectivity | Connectivity | Ping | OFFLINE |
| NON-SAM-APP-T05.cust.domain.net | Region2/PPMO | ALL | ALL | ALL | ALL | FOLDERLIST | Customizations | | No Files Exist |
| NON-SAM-APP-T03.cust.domain.net | Region2/PPMO | ALL | ALL | ALL | ALL | PERMISSIONS | Customizations | | \Extensions does not exist |
| NON-SAM-SQL-T01.cust.domain.net | Region0/BRC | ALL | ALL | ALL | ALL | PERMISSIONS | Customizations | | \MiniApps does not exist |
| NON-SAM-SQL-T01.cust.domain.net | Region0/BRC | ALL | SQL | ALL | SQL | SQL | DB_Collation | master | ABNSAMSQLT01_SECURITY |
| NON-SAM-SQL-T03.cust.domain.net | Region2/PPMO | ALL | SQL | ALL | SQL | SQL | DB_max_server_mem | master | max server memory (MB) |
| NON-SAM-APP-D01.cust.domain.net | Region1/DEV | ALL | ALL | ALL | SQL | SQL | DB_SYSDB_TSRE | SYSDB | AFW_VirtualDirectory |
| NON-SAM-APP-T04.cust.domain.net | Region2/PPMO | ALL | ALL | ALL | ALL | RegKey | DCOM_SEC | AccountName | NT AUTHORITY\NetworkService |
| NON-SAM-APP-T04.cust.domain.net | Region2/PPMO | ALL | ALL | ALL | ALL | RegKey | DCOM_SEC | EnableDCOM | Y |
| NON-SAM-SQL-T02.cust.domain.net | Region1/DEV | ALL | ALL | ALL | ALL | RegKey | DCOM_SEC | LegacyAuthenticationLevel | Key Not Found |
| NON-SAM-APP-T03.cust.domain.net | Region1/DEV | ALL | ALL | ALL | ALL | RegKey | DCOM_SEC | NetworkDtcAccess | 1 |
| NON-SAM-APP-T03.cust.domain.net | Region1/DEV | ALL | ALL | ALL | ALL | RegKeyList | Installed | DisplayName | QNXT_5.20.001.001_x64 |
| NON-SAM-APP-T03.cust.domain.net | Region1/DEV | ALL | ALL | ALL | ALL | RegKeyList | Installed | DisplayName | QNXT_QFramework_5.20.001.001_x64 |
| NON-SAM-APP-T03.cust.domain.net | Region1/DEV | ALL | ALL | ALL | ALL | RegKeyList | Installed | DisplayName | QNXT_Reports_5.20.001.000_x64 |
| NON-SAM-APP-T04.cust.domain.net | Region2/PPMO | ALL | ALL | ALL | ALL | RegKeyList | Installed | DisplayName | QNXT_5.20.001.001_x64 |
| NON-SAM-APP-T04.cust.domain.net | Region2/PPMO | ALL | ALL | ALL | ALL | RegKeyList | Installed | DisplayName | QNXT_Connect_5.20.001.000_x64 |
| NON-SAM-APP-T04.cust.domain.net | Region2/PPMO | ALL | ALL | ALL | ALL | RegKeyList | Installed | DisplayName | QNXT_Connect_Explorer_5.20.001.000_x64 |
| NON-SAM-APP-T04.cust.domain.net | Region2/PPMO | ALL | ALL | ALL | ALL | RegKeyList | Installed | DisplayName | QNXT_QFramework_5.20.001.001_x64 |
| NON-SAM-APP-T04.cust.domain.net | Region2/PPMO | ALL | ALL | ALL | ALL | RegKeyList | Installed | DisplayName | QNXT_QXI_5.20.001.000_x64 |
| NON-SAM-APP-T04.cust.domain.net | Region2/PPMO | ALL | ALL | ALL | ALL | RegKeyList | Installed | DisplayName | QuickTest Add-in for Quality Center |

Figure 13

| Server | Environment | Product | Type | Role | Version | Check_Type | Check_Category | Check_Value | Results | Results2 |
|---|---|---|---|---|---|---|---|---|---|---|
| NON-SAM-APP-D01.cust.domain.net | Region1/DEV | ALL | ALL | ALL | ALL | RegKey | 11_VirtualOrPhysical | SystemManufacturer | VMware, Inc. | |
| NON-SAM-SQL-T01.cust.domain.net | Region0/BRC | ALL | ALL | ALL | ALL | RegKey | 11_VirtualOrPhysical | SystemManufacturer | HP | |
| PRO-SAM-WAS-01.cust.domain.net | Region3/PROD | ALL | ALL | ALL | ALL | RegKeyCount | 12_CPU_count | Count | 1 | |
| NON-SAM-APP-T04.cust.domain.net | Region2/PPMO | ALL | ALL | ALL | ALL | Memory | 13_Memory | | Total | 6 gb |
| NON-SAM-APP-T05.cust.domain.net | Region2/PPMO | ALL | ALL | ALL | ALL | Memory | 13_Memory | | Total | 4 gb |
| PRO-SAM-WEB-01.cust.domain.net | Region3/PROD | ALL | ALL | ALL | ALL | Disk Info | 14_Disk Info | D: | Used Space | 6 gb |
| NON-SAM-APP-D01.cust.domain.net | Region1/DEV | ALL | ALL | ALL | ALL | RegKey | 15_BindOrder | Bind | | 1,LAN |
| NON-SAM-APP-T03.cust.domain.net | Region1/DEV | ALL | ALL | ALL | ALL | RegKey | 18_Hardware | Identifier | Intel64 Family 6 Model 45 Stepping 7 | |
| NON-SAM-APP-D01.cust.domain.net | Region1/DEV | ALL | ALL | ALL | ALL | RegKey | 18_Hardware | ProcessorNameString | Intel(R) Xeon(R) CPU E5-2665 0 @ 2.40GHz | |
| NON-SAM-APP-D01.cust.domain.net | Region1/DEV | ALL | ALL | ALL | ALL | RegKey | 19_OS | CSDVersion | Service Pack 1 | |
| NON-SAM-APP-D01.cust.domain.net | Region1/DEV | ALL | ALL | ALL | ALL | RegKey | 19_OS | CurrentBuild | | 7601 |
| NON-SAM-SQL-T05.cust.domain.net | Region2/PPMO | ALL | SQL | ALL | SQL | SQL | DB_Server_Users | master | Server Users | SQL_LOGIN |
| NON-SAM-SQL-T03.cust.domain.net | Region2/PPMO | ALL | SQL | ALL | SQL | SQL | DB_SYSDB_TSRE | SYSDB | ICDTM_SystemID | TZICD |
| NON-SAM-SQL-T03.cust.domain.net | Region2/PPMO | ALL | SQL | ALL | SQL | SQL | DB_SYSDB_TSRE | SYSDB | ICDTM_VirtualDirectory | TZ_ICD_Config |
| NON-SAM-SQL-T03.cust.domain.net | Region2/PPMO | ALL | SQL | ALL | SQL | SQL | DB_SYSDB_TSRE | SYSDB | ICDTM_VirtualDirectory | TZ_WIDGET_ICDTM |
| NON-SAM-SQL-T03.cust.domain.net | Region2/PPMO | ALL | SQL | ALL | SQL | SQL | DB_SYSDB_TSRE | SYSDB | ICDTMClient_VirtualDirectory | TZ_WIDGET_ICDTM_CLIENT |
| NON-SAM-SQL-T03.cust.domain.net | Region2/PPMO | ALL | SQL | ALL | SQL | SQL | DB_SYSDB_TSRE | SYSDB | ServiceWebsite | TrizettoSecurityFrameworkServices161 |
| NON-SAM-APP-T01.cust.domain.net | Region0/BRC | ALL | ALL | ALL | ALL | FOLDERLIST | Folder_list | | QNXT | 2/20/2015 17:09 |
| NON-SAM-APP-T01.cust.domain.net | Region0/BRC | ALL | ALL | ALL | ALL | FOLDERLIST | Folder_list | | QNXT Connect | 2/20/2015 17:12 |
| NON-SAM-APP-T01.cust.domain.net | Region0/BRC | ALL | ALL | ALL | ALL | FOLDERLIST | Folder_list | | QNXT Connect Explorer | 2/20/2015 17:12 |
| NON-SAM-APP-T01.cust.domain.net | Region0/BRC | ALL | ALL | ALL | ALL | FOLDERLIST | Folder_list | | QX! 5.20 | 2/20/2015 17:12 |
| NON-SAM-APP-T01.cust.domain.net | Region0/BRC | ALL | ALL | ALL | ALL | Group | Group_Members | | TZG Application Deployment | |
| NON-SAM-APP-T01.cust.domain.net | Region0/BRC | ALL | ALL | ALL | ALL | Group | Group_Members | | TZG Application Deployment Engineering | |
| NON-SAM-APP-T01.cust.domain.net | Region0/BRC | ALL | ALL | ALL | ALL | Group | Group_Members | | TZG Batch Accounts | |
| NON-SAM-APP-T01.cust.domain.net | Region0/BRC | ALL | ALL | ALL | ALL | Group | Group_Members | | TZG Batch Services | |
| NON-SAM-APP-T01.cust.domain.net | Region0/BRC | ALL | ALL | ALL | ALL | Group | Group_Members | | TZG Consulting | |
| NON-SAM-APP-T01.cust.domain.net | Region0/BRC | ALL | ALL | ALL | ALL | Group | Group_Members | | TZG Domain Admins | |
| NON-SAM-APP-T01.cust.domain.net | Region0/BRC | ALL | ALL | ALL | ALL | Group | Group_Members | | TZG EDI Implementation | |
| NON-SAM-APP-T01.cust.domain.net | Region0/BRC | ALL | ALL | ALL | ALL | Group | Group_Members | | TZG EDM Implementation | |
| NON-SAM-APP-T01.cust.domain.net | Region0/BRC | ALL | ALL | ALL | ALL | Group | Group_Members | | TZG EMS Administrators | |
| NON-SAM-APP-T01.cust.domain.net | Region0/BRC | ALL | ALL | ALL | ALL | Group | Group_Members | | TZG QA | |
| NON-SAM-APP-T01.cust.domain.net | Region0/BRC | ALL | ALL | ALL | ALL | Group | Group_Members | | TZG Server Admins | |
| NON-SAM-APP-T01.cust.domain.net | Region0/BRC | ALL | ALL | ALL | ALL | Group | Group_Members | | TZG Service Accounts | |
| NON-SAM-APP-T01.cust.domain.net | Region0/BRC | ALL | ALL | ALL | ALL | Group | Group_Members | | TZGAdmin | |
| NON-SAM-BIZ-T01.cust.domain.net | Region1/DEV | ALL | ALL | ALL | ALL | RegKeyList | Installed | DisplayName | QNXT_5.20.001.001_x64 | 5.20.001.001 |
| NON-SAM-BIZ-T01.cust.domain.net | Region1/DEV | ALL | ALL | ALL | ALL | RegKeyList | Installed | DisplayName | QNXT_Connect_5.20.001.000_x64 | 5.20.001.000 |
| NON-SAM-BIZ-T01.cust.domain.net | Region1/DEV | ALL | ALL | ALL | ALL | RegKeyList | Installed | DisplayName | QNXT_QFramework_5.20.001.001_x64 | 5.20.001.001 |

Figure 14

| Server Name | ENV | Type | CPU/RAM | Storage Drives | Hardware Meets Min Rqmt | OS Matches Min Rqmt | TZ Software Installed | TZ Patch Lev. | Config Files DB Server correct | Config Files DB Name Correct | Config Files NAS path Correct | Product Registry Setting Correct | Services Running | Services Run as Correct User | Applications Launch | 3rd Party Software Installed | Evidence of Custom Code | Monitoring Installed (Hosted) |
|---|---|---|---|---|---|---|---|---|---|---|---|---|---|---|---|---|---|---|
| NON-SAM-APP-T01 | Region0/BRC | VMware:Inc. | 2 x 6 gb | c:60; d:10 | yes | yes | SEE EVP | SEE EVP | yes | yes | yes | yes | yes | yes | yes | yes | yes | yes |
| NON-SAM-HUB-T01 | Region0/BRC | VMware:Inc. | 1 x 4 gb | c:60; d:10 | yes | yes | SEE EVP | SEE EVP | yes | yes | yes | yes | yes | yes | yes | yes | yes | yes |
| NON-SAM-SQL-T01 | Region0/BRC | HP | 24 x 80 gb | c:60; d:10 | yes | yes | SEE EVP | SEE EVP | na | no | na | na | na | na | na | na | no | yes |
| SAMCIFSQNXT501CFG1 | Region0/BRC | NAS | | c:60; d:10 | yes | yes | NAS | | yes | yes | yes | na | na | na | na | na | na | yes |
| NON-SAM-APP-D01 | Region1/DEV | VMware:Inc. | 2 x 4 gb | c:60; d:10 | yes | yes | SEE EVP | SEE EVP | yes | yes | yes | na | yes | na | na | yes | na | yes |
| NON-SAM-APP-T03 | Region1/DEV | VMware:Inc. | 2 x 4 gb | c:60; d:10 | yes | yes | SEE EVP | SEE EVP | yes | yes | yes | yes | yes | yes | yes | yes | yes | yes |
| NON-SAM-BIZ-T01 | Region1/DEV | VMware:Inc. | 2 x 4 gb | c:60; d:10 | yes | yes | SEE EVP | SEE EVP | yes | yes | yes | yes | yes | yes | yes | yes | yes | yes |
| NON-SAM-HUB-T02 | Region1/DEV | VMware:Inc. | 1 x 4 gb | c:60; d:10 | yes | yes | SEE EVP | SEE EVP | yes | yes | yes | yes | yes | yes | yes | yes | yes | yes |
| NON-SAM-SQL-T02 | Region1/DEV | HP | 24 x 80 gb | c:60; d:10; l:100; r:400 | yes | yes | SEE EVP | SEE EVP | na | na | na | na | yes | yes | no | na | no | yes |
| NON-SAM-WAS-D01 | Region1/DEV | VMware:Inc. | 2 x 4 gb | c:60; d:10 | yes | yes | SEE EVP | SEE EVP | yes | yes | yes | yes | yes | yes | yes | yes | yes | yes |
| SAMCIFSQNXT501DEV | Region1/DEV | NAS | | c:60; d:10 | yes | yes | NAS | | yes | yes | yes | na | na | na | na | na | na | yes |
| NON-SAM-APP-T04 | Region2/PPMO | VMware:Inc. | 2 x 6 gb | c:60; d:10 | yes | yes | SEE EVP | SEE EVP | yes | yes | yes | yes | yes | yes | yes | yes | yes | yes |
| NON-SAM-APP-T05 | Region2/PPMO | VMware:Inc. | 2 x 4 gb | c:60; d:10 | yes | yes | SEE EVP | SEE EVP | yes | yes | yes | yes | yes | yes | yes | yes | yes | yes |
| NON-SAM-APP-T06 | Region2/PPMO | VMware:Inc. | 2 x 4 gb | c:60; d:10 | yes | yes | SEE EVP | SEE EVP | yes | yes | yes | yes | yes | yes | yes | yes | yes | yes |
| NON-SAM-APP-T07 | Region2/PPMO | VMware:Inc. | 2 x 4 gb | c:60; d:10 | yes | yes | SEE EVP | SEE EVP | yes | yes | yes | yes | yes | yes | yes | yes | yes | yes |
| NON-SAM-BIZ-T02 | Region2/PPMO | VMware:Inc. | 2 x 4 gb | c:60; d:10 | yes | yes | SEE EVP | SEE EVP | yes | yes | yes | yes | yes | yes | yes | yes | yes | yes |
| NON-SAM-HUB-T03 | Region2/PPMO | VMware:Inc. | 1 x 4 gb | c:60; d:10 | yes | yes | SEE EVP | SEE EVP | yes | yes | yes | yes | yes | yes | yes | yes | yes | yes |
| NON-SAM-HHM-T01 | Region2/PPMO | VMware:Inc. | 2 x 4 gb | c:60; d:10 | yes | yes | SEE EVP | SEE EVP | yes | yes | yes | yes | yes | yes | yes | yes | no | yes |
| NON-SAM-SQL-T03 | Region2/PPMO | HP | 24 x 144 gb | c:60; d:10; l:100; r:400 | yes | yes | SEE EVP | SEE EVP | na | na | na | na | yes | yes | yes | na | no | yes |
| NON-SAM-SQL-T04 | Region2/PPMO | VMware:Inc. | 2 x 6 gb | c:60; d:10 | yes | yes | SEE EVP | SEE EVP | na | na | na | na | yes | yes | yes | na | no | yes |
| NON-SAM-SQL-T05 | Region2/PPMO | VMware:Inc. | 2 x 4 gb | c:60; d:10 | yes | yes | SEE EVP | SEE EVP | na | na | na | yes | yes | yes | yes | yes | no | yes |
| NON-SAM-WAS-T01 | Region2/PPMO | VMware:Inc. | 2 x 4 gb | c:60; d:10 | yes | yes | SEE EVP | SEE EVP | yes | yes | yes | yes | yes | yes | yes | yes | no | yes |
| NON-SAM-xEN-T01 | Region2/PPMO | VMware:Inc. | 2 x 4 gb | c:60; d:10 | yes | yes | SEE EVP | SEE EVP | yes | yes | yes | yes | yes | yes | yes | yes | yes | yes |
| SAMCIFSQNXT501TEST | Region2/PPMO | NAS | | c:60; d:10 | yes | yes | NAS | | yes | yes | yes | na | na | na | na | na | na | yes |
| PRO-SAM-APP-01 | Region3/PROD | VMware:Inc. | 2 x 6 gb | c:60; d:10 | yes | yes | SEE EVP | SEE EVP | yes | yes | yes | yes | yes | yes | yes | yes | yes | yes |
| PRO-SAM-APP-02 | Region3/PROD | VMware:Inc. | 2 x 6 gb | c:60; d:10 | yes | yes | SEE EVP | SEE EVP | yes | yes | yes | yes | yes | yes | yes | yes | yes | yes |
| PRO-SAM-APP-03 | Region3/PROD | VMware:Inc. | 2 x 4 gb | c:60; d:10 | yes | yes | SEE EVP | SEE EVP | yes | yes | yes | yes | yes | yes | yes | yes | yes | yes |
| PRO-SAM-APP-04 | Region3/PROD | VMware:Inc. | 2 x 4 gb | c:60; d:10 | yes | yes | SEE EVP | SEE EVP | yes | yes | yes | yes | yes | yes | yes | yes | yes | yes |
| PRO-SAM-APP-05 | Region3/PROD | VMware:Inc. | 1 x 4 gb | c:60; d:10 | yes | yes | SEE EVP | SEE EVP | yes | yes | yes | yes | yes | yes | yes | yes | no | yes |
| PRO-SAM-BIZ-01 | Region3/PROD | VMware:Inc. | 2 x 4 gb | c:60; d:10 | yes | yes | SEE EVP | SEE EVP | yes | yes | yes | yes | yes | yes | yes | yes | no | yes |
| PRO-SAM-HUB-01 | Region3/PROD | VMware:Inc. | 1 x 4 gb | c:60; d:10 | yes | yes | SEE EVP | SEE EVP | yes | yes | yes | yes | yes | yes | yes | yes | no | yes |
| PRO-SAM-HHM-01 | Region3/PROD | VMware:Inc. | 2 x 4 gb | c:60; d:10; l:100; r:400 | yes | yes | SEE EVP | SEE EVP | yes | yes | yes | yes | yes | yes | yes | yes | yes | yes |
| PRO-SAM-SQL-01 | Region3/PROD | HP | 24 x 80 gb | c:60; d:10; l:100; r:400 | yes | yes | SEE EVP | SEE EVP | na | na | na | na | yes | yes | yes | yes | no | yes |
| PRO-SAM-SQL-02 | Region3/PROD | VMware:Inc. | 2 x 6 gb | c:60; d:10 | yes | yes | SEE EVP | SEE EVP | yes | yes | yes | yes | yes | yes | yes | yes | no | yes |
| PRO-SAM-WAS-01 | Region3/PROD | VMware:Inc. | 1 x 4 gb | c:60; d:10 | yes | yes | SEE EVP | SEE EVP | yes | yes | yes | yes | yes | yes | yes | yes | no | yes |
| PRO-SAM-WEB-01 | Region3/PROD | VMware:Inc. | 1 x 4 gb | c:60; d:10 | yes | yes | SEE EVP | SEE EVP | yes | yes | yes | yes | yes | yes | yes | yes | no | yes |
| SAMCIFSQNXT501PROD | Region3/PROD | NAS | | c:60; d:10 | yes | yes | NAS | | yes | yes | yes | na | na | na | na | na | na | yes |
| SAMCIFSTMS501PROD | Region3/PROD | NAS | | c:60; d:10 | yes | yes | NAS | | yes | yes | yes | na | na | na | na | na | na | yes |

Figure 15a

| Issue Description | Date | # of Server(s) Affected | NSD Ticket # | Status | Comments |
|---|---|---|---|---|---|
| PRO-SAM-IHM-01 - servers setup as a 1x4. IHM server recommendation is 2x4 | 24-Feb-15 | 1 | 100-10007 | resolved | VM changed to 2x4. Validation completed. |
| NON-SAM-APP-T01 - config file for batch references NAS drive that does not resolve in DNS - AMCIFSQNXT501CFG - Typo? | 24-Feb-15 | 1 | 100-10012 | resolved | Ticket resolved by ARS and validation completed. |
| NON-SAM-SQL-T02 - MS Sql Server service not setup to auto start or running as QNXT services account. | 24-Feb-15 | 1 | 100-10013 | resolved | Service run parameters updated. Validation completed. |
| NON-SAM-SQL-T03 - bind order wrong. Expected LAN IP to be listed as 1 and Storage as 2. Storage in is position 1 | 24-Feb-15 | 1 | 100-10014 | resolved | Platform services fixed and validation completed. |
| PRO-SAM-APP-01 - Microdyn config file pointing at PPMO server. Change to point to PROD Microdyn instance | 24-Feb-15 | | 100-10015 | resolved | Configuration updated and validated |
| PRO-SAM-APP-03 - QNXT Connect on lower patch level then other servers. On 5.20.000.000. Others on 5.20.001.001 | 24-Feb-15 | 1 | 100-10017 | resolved | Correct QNXT Connect patch level applied |
| PRO-SAM-APP-03 - config file c:program files\QNXT\example\config.xml 'Path' value pointing at PPMO server. Expected server is PRO-SAM-HUB-01 | 24-Feb-15 | 1 | 100-10018 | resolved | Config file updated and validation complete |
| NON-SAM-SQL-T01 - Region 0/BRC database server - DB entries for CF1 and CFG2 environments point to expected databases, but UI descriptions are the same for both. Change CFG2 to indicate CFG2 | 24-Feb-15 | 1 | 100-10022 | resolved | Configuration updated and validated |
| PRO-SAM-APP-01, PRO-SAM-APP-02, PRO-SAM-APP-03, PRO-SAM-APP-04, PRO-SAM-APP-05 - Hosting monitoring software not installed or running | 24-Feb-15 | 5 | 100-10025 | open | Routed to EMS Monitoring team for installation before testing concludes. |

Figure 15b

| Environment Portfolio | | | | | |
|---|---|---|---|---|---|
| Project: | | | | Project Manager: | |
| Date: | 24-Feb-15 | | | Architect / TSM: | |
| Build: | | | | EvP Version: | 2242015 |
| | | | | | |
| Region / Environment | Location | Vendor | Product | Module | App Version |
| | | | | | |
| Region0/BRC | | | | | |
| | NON | MCKESSON HEALTH SOLUTIONS | MCKESSON | Claim Check | 53.00.000.000 |
| | NON | MICRO-DYN MEDICAL SYSTEMS | MICRODYN | PricerActive | 2.00.134.002 |
| | NON | MICRO-DYN MEDICAL SYSTEMS | MICRODYN | DRGActive | 2.00.134.000 |
| | NON | MICRO-DYN MEDICAL SYSTEMS | MICRODYN | APCActive | 2.00.015.000 |
| | NON | TRIZETTO | QNXT | Core | 5.20.001.001 |
| | NON | TRIZETTO | BATCH | HBA | 1.00.000.000 |

Figure 16a

| Project: | | | | | Project Manager: | | |
|---|---|---|---|---|---|---|---|
| Date: | 24-Feb-15 | | | | Architect / TSM: | | |
| Build: | | | | | EvP Version: | 2242015 | |
| | | | | Solutions | | | |
| Region / Environment | Name | DNS Name | | Applications | Role | Ancillary Applications | |
| Region0/BRC | | | | | | | |
| | | | | | | APCActive.Net Enterprise Pricer DLL - 64-Bit | 2.00.015.000 |
| | | | | | | ClaiCheck 10.1.53 Knowledge Base | 53.00.000.000 |
| | | | | | | ClaimCheck QNXT Integration Wizard and Module 5.1 | 5.01.000.000 |
| | | | | | | DRGActive.Net Enterprise 2-YR DLL (FY13-14) 64-Bit | 2.00.134.000 |
| | | | | | | HBA481_03_01 | 1.00.000.000 |
| | | | | | | Micro Focus Server 5.1 | 5.104.083.000 |
| | | | | | | Microsoft Office Professional Plus 2010 | 14.00.6029.1000 |
| | | | | | | PRICERActive.Net Enterprise 2-YR DLL (FY13-14) - 64-Bit | 2.00.134.002 |
| | | | | | | QNXT_5.20.001.001_x64 | 5.20.001.001 |
| | | | | | | QNXT_Connect_5.20.001.000_x64 | 5.20.001.000 |
| | | | | | | QNXT_Connect_Explorer_5.20.001.000_x64 | 5.20.001.000 |
| | | | | | | QNXT_QFramework_5.20.001.001_x64 | 5.20.001.001 |
| | | | | | | QNXT_QXI_5.20.001.000_x64 | 5.20.001.000 |
| Region0/BRC | NON-SAM-APP-T01 | cust.domain.net | | | | SQL Server 2008 R2 Integration Services | 10.50.1600.001 | ONLINE |
| Region0/BRC | NON-SAM-HUB-T01 | cust.domain.net | | | HUB | QNXT_5.20.001.001_x64 | 5.20.001.001 | ONLINE |
| Region0/BRC | NON-SAM-SQL-T01 | cust.domain.net | | | | QNXT_Connect_5.20.001.000_x64 | 5.20.001.000 | ONLINE |
| Region0/BRC | SAMCIFSQNXT501CFG1 | cust.domain.net | | | NAS | QNXT_QFramework_5.20.001.001_x64 | 5.20.001.001 | |
| | | | | | | SQL Server 2008 R2 SP1 Integration Services | 10.51.2500.000 | ONLINE |

Figure 16b

| Environment Portfolio | | | | | Project Manager: | | | | |
|---|---|---|---|---|---|---|---|---|---|
| Project: | | | | | Architect / TSM: | | | | |
| Date: | 24-Feb-15 | | | | EvP Version: | 2242015 | | | |
| Build: | | | | | | | | | |
| Region / Environment | Name | Database Platform | Schema Versions | Associated Applications | DB Allocated | DB Actual | Log Allocated | Log Actual |
| Region0/BRC | | | | | | | | | |
| Region0/BRC | NON-SAM-SQL-T01 | Claim Check | ClaimDef | ClaimDef | 500 MB | 3 MB | 3 MB | 1 MB |
| Region0/BRC | NON-SAM-SQL-T01 | Custom | Custom | Customer Code | 3474 MB | 3364 MB | 5474 MB | 59 MB |
| Region0/BRC | NON-SAM-SQL-T01 | Custom | Custom_cfg1 | Customer Code | 153 MB | 150 MB | 161 MB | 8 MB |
| Region0/BRC | NON-SAM-SQL-T01 | Custom | Custom_cfg2 | Customer Code | 3 MB | 1 MB | 2 MB | 1 MB |
| Region0/BRC | NON-SAM-SQL-T01 | MicroDyn | APCEDITMD | MicroDyn APC Active Code Editor | 58 MB | 53 MB | 2 MB | 1 MB |
| Region0/BRC | NON-SAM-SQL-T01 | MicroDyn | APCPYMTMD | MicroDyn APC Enterprise Pricer | 93 MB | 84 MB | 2 MB | 1 MB |
| Region0/BRC | NON-SAM-SQL-T01 | MicroDyn | DRG2YRMD | MicroDyn DRGActive | 24 MB | 23 MB | 12 MB | 2 MB |
| Region0/BRC | NON-SAM-SQL-T01 | MicroDyn | PRC2YRMD | MicroDyn PricerActive 2 YR | 25 MB | 23 MB | 2 MB | 1 MB |
| Region0/BRC | NON-SAM-SQL-T01 | QNXT | BAMArchive | BizTalk Archive | 500 MB | 2 MB | 1 MB | |
| Region0/BRC | NON-SAM-SQL-T01 | QNXT | BAMPrimaryImport | Primary Import | 500 MB | 3 MB | 3 MB | 1 MB |
| Region0/BRC | NON-SAM-SQL-T01 | QNXT | BizTalkDTADb | BizTalk DTA Database | 500 MB | 5 MB | 3 MB | 1 MB |
| Region0/BRC | NON-SAM-SQL-T01 | QNXT | BizTalkMgmtDb | BizTalk Management Database | 500 MB | 52 MB | 69 MB | 4 MB |
| Region0/BRC | NON-SAM-SQL-T01 | QNXT | BizTalkMsgBoxDb | BizTalk Message Box Database | 500 MB | 7 MB | 386 MB | 10 MB |
| Region0/BRC | NON-SAM-SQL-T01 | QNXT | BizTalkRuleEngineDb | BizTalk Rules Engine Database | 500 MB | 2 MB | 1 MB | |
| Region0/BRC | NON-SAM-SQL-T01 | QNXT | MessageStore | Message Store | 500 MB | 2 MB | 200 MB | 10 MB |
| Region0/BRC | NON-SAM-SQL-T01 | QNXT | PlanData_cfg1 | Plandata | 52 MB | 49 MB | 1225 MB | 9 MB |
| Region0/BRC | NON-SAM-SQL-T01 | QNXT | PlanData_cfg2 | Plandata | 52 MB | 49 MB | 675 MB | 6 MB |
| Region0/BRC | NON-SAM-SQL-T01 | QNXT | PlanDocument_cfg1 | PlanDocument | 500 MB | 2 MB | 50 MB | 8 MB |
| Region0/BRC | NON-SAM-SQL-T01 | QNXT | PlanDocument_cfg2 | PlanDocument | 500 MB | 2 MB | 50 MB | 8 MB |
| Region0/BRC | NON-SAM-SQL-T01 | QNXT | PlanEvent | Plan Event | 500 MB | 2 MB | 5000 MB | 37 MB |
| Region0/BRC | NON-SAM-SQL-T01 | QNXT | PlanIntegration | Plan Integration | 500 MB | 18 MB | 1030 MB | 117 MB |
| Region0/BRC | NON-SAM-SQL-T01 | QNXT | QCSIDB | QCSI Database | 500 MB | 57 MB | 115 MB | 4 MB |
| Region0/BRC | NON-SAM-SQL-T01 | QNXT | QNXT_System_Manager | QNXT | 45 MB | 45 MB | 36 MB | 2 MB |
| Region0/BRC | NON-SAM-SQL-T01 | QNXT | SSODB | BizTalk SSO | 500 MB | 4 MB | 5 MB | 1 MB |
| Region0/BRC | NON-SAM-SQL-T01 | Reporting | ReportServer | Reporting | 500 MB | 18 MB | 22 MB | 3 MB |
| Region0/BRC | NON-SAM-SQL-T01 | Reporting | ReportServerTempDB | Reporting | 500 MB | 2 MB | 1 MB | |
| Region0/BRC | NON-SAM-SQL-T01 | Security | SAMSQLT01_SECURITY | Security | 131 MB | 2 MB | 65 MB | 6 MB |
| Region0/BRC | NON-SAM-SQL-T01 | Staging | Stage | Stage | 3 MB | 1 MB | 1 MB | |
| Region0/BRC | NON-SAM-SQL-T01 | Staging | Stage_cfg1 | Stage | 3 MB | 1 MB | 1 MB | |
| Region0/BRC | NON-SAM-SQL-T01 | Staging | Stage_cfg2 | Stage | 3 MB | 1 MB | 1 MB | |
| Region0/BRC | NON-SAM-SQL-T01 | System | Harcore | Auto Parameter Database | 3 MB | 2 MB | 1 MB | |
| Region0/BRC | NON-SAM-SQL-T01 | System | master | Master Database | 4 MB | 3 MB | 1 MB | |
| Region0/BRC | NON-SAM-SQL-T01 | System | model | MS default DB | 2 MB | 1 MB | 2 MB | |
| Region0/BRC | NON-SAM-SQL-T01 | System | msdb | MS DB | 69 MB | 66 MB | 5 MB | 3 MB |
| Region0/BRC | NON-SAM-SQL-T01 | System | tempdb | Default Temp DB | 11 MB | 8 MB | 1 MB | |
| Region0/BRC | NON-SAM-SQL-T01 | Trizetto Tools | dbadmin | Database Admin Tools | 24 MB | 17 MB | 180 MB | 9 MB |

Figure 16c

| Environment Portfolio | | | | | | | | | |
|---|---|---|---|---|---|---|---|---|---|
| Project: | | | | Project Manager: | | | | | |
| Date: | 24-Feb-15 | | | Architect / TSM: | | | | | |
| Build: | | | | EvP Version: | 2242015 | | | | |
| | | | | | | | | | |
| Region / Environment | Name | Asset Tag | Make / Model | Configuration | Operating System | Function | IP Address - Data | Database Port | Notes |
| Region0/BRC | | | | | | | | | |
| Region0/BRC | NON-SAM-APP-T01 | | VMware: Inc. | 2 x 6 gb | Windows Server 2008 R2 Standard | | 10.1.2.64 | | ONLINE |
| Region0/BRC | NON-SAM-HUB-T01 | | VMware: Inc. | 1 x 4 gb | Windows Server 2008 R2 Standard | | 10.1.2.65 | | ONLINE |
| | | | | | | | 10.2.3.63 | | |
| Region0/BRC | NON-SAM-SQL-T01 | | HP | 24 x 80 gb | Windows Server 2008 R2 Enterprise | | 10.1.2.63 | | ONLINE |
| Region0/BRC | SAMCIFSQNXT501CFG1 | | | | | | | | ONLINE |

Figure 16d

| Environment Portfolio | | | | | Project Manager: | | |
|---|---|---|---|---|---|---|---|
| Project: | | | | | Architect / TSM: | | |
| Date: | 24-Feb-15 | | | | EvP Version: | | |
| Build: | | | | | Ancillary Applications | | 2242015 |
| Region / Environment | Name | | Solutions Applications | Role | | App Version | |
| Region0/BRC | NON-SAM-APP-T01 | | cust.domain.net | | | APCActive.Net Enterprise Code Editor DLL - 64-Bit | |
| Region0/BRC | NON-SAM-APP-T01 | | cust.domain.net | | | APCActive.Net Enterprise Pricer DLL - 64-Bit | |
| Region0/BRC | NON-SAM-APP-T01 | | cust.domain.net | | | CC Registry Update | |
| Region0/BRC | NON-SAM-APP-T01 | | cust.domain.net | | | ClaimCheck 10.1 CCI/OCE 20.0 Knowledge Base | |
| Region0/BRC | NON-SAM-APP-T01 | | cust.domain.net | | | ClaimCheck 10.1 Software 64-Bit | |
| Region0/BRC | NON-SAM-APP-T01 | | cust.domain.net | | | ClaimCheck 10.1.49 Knowledge Base | |
| Region0/BRC | NON-SAM-APP-T01 | | cust.domain.net | | | ClaimCheck 10.1.52 Knowledge Base | |
| Region0/BRC | NON-SAM-APP-T01 | | cust.domain.net | | | ClaimCheck 10.1.53 Knowledge Base | |
| Region0/BRC | NON-SAM-APP-T01 | | cust.domain.net | | | ClaimCheck QNXT Integration Wizard and Module 5.1 | |
| Region0/BRC | NON-SAM-APP-T01 | | cust.domain.net | | | Crystal Report 2008 Runtime SP3 | |
| Region0/BRC | NON-SAM-APP-T01 | | cust.domain.net | | | DRGActive.Net Enterprise 2-YR DLL (FY13-14) 64-Bit | |
| Region0/BRC | NON-SAM-APP-T01 | | cust.domain.net | | | HBA481_03_01 | |
| Region0/BRC | NON-SAM-APP-T01 | | cust.domain.net | | | HP Software Perl | |
| Region0/BRC | NON-SAM-APP-T01 | | cust.domain.net | | | Micro Focus Server 5.1 | |
| Region0/BRC | NON-SAM-APP-T01 | | cust.domain.net | | | PRICERActive.Net Enterprise 2-YR DLL (FY13-14) - 64-Bit | |
| Region0/BRC | NON-SAM-APP-T01 | | cust.domain.net | | | QNXT_5.20.001.001_x64 | |
| Region0/BRC | NON-SAM-APP-T01 | | cust.domain.net | | | QNXT_Connect_5.20.001.000_x64 | |
| Region0/BRC | NON-SAM-APP-T01 | | cust.domain.net | | | QNXT_Connect_Explorer_5.20.001.000_x64 | |
| Region0/BRC | NON-SAM-APP-T01 | | cust.domain.net | | | QNXT_QFramework_5.20.001.001_x64 | |
| Region0/BRC | NON-SAM-APP-T01 | | cust.domain.net | | | QNXT_QXI_5.20.001.000_x64 | |

Figure 16e

Serial No. 15/345,043
Filed: November 7, 2016
Inventors: William L. BENSON, et al.
Docket No. TZG0038
Page 1 of 1
REPLACEMENT SHEET

| SERVER | ENV |
|---|---|
| NON-SAM-APP-D01.cust.domain.net | Region1/DEV |
| NON-SAM-APP-D03.cust.domain.net | Region1/DEV |
| NON-SAM-APP-T01.cust.domain.net | Region0/BRC |
| NON-SAM-APP-T02.cust.domain.net | Region1/DEV |
| NON-SAM-APP-T03.cust.domain.net | Region1/DEV |
| NON-SAM-APP-T04.cust.domain.net | Region2/PPMO |
| NON-SAM-APP-T05.cust.domain.net | Region2/PPMO |
| NON-SAM-APP-T06.cust.domain.net | Region2/PPMO |
| NON-SAM-APP-T07.cust.domain.net | Region2/PPMO |
| NON-SAM-APP-T12.cust.domain.net | decom |
| NON-SAM-BIZ-T01.cust.domain.net | Region1/DEV |
| NON-SAM-BIZ-T02.cust.domain.net | Region2/PPMO |
| NON-SAM-HUB-T01.cust.domain.net | Region0/BRC |
| NON-SAM-HUB-T02.cust.domain.net | Region1/DEV |
| NON-SAM-HUB-T03.cust.domain.net | Region2/PPMO |
| NON-SAM-IHM-T01.cust.domain.net | Region2/PPMO |
| NON-SAM-SQL-D03.cust.domain.net | Region1/DEV |
| NON-SAM-SQL-T01.cust.domain.net | Region0/BRC |
| NON-SAM-SQL-T02.cust.domain.net | Region1/DEV |
| NON-SAM-SQL-T03.cust.domain.net | Region2/PPMO |
| NON-SAM-SQL-T04.cust.domain.net | Region2/PPMO |
| NON-SAM-SQL-T05.cust.domain.net | Region2/PPMO |
| NON-SAM-SQL-T14.cust.domain.net | decom |
| NON-SAM-WAS-D01.cust.domain.net | Region1/DEV |
| NON-SAM-WAS-T01.cust.domain.net | Region2/PPMO |
| NON-SAM-WEB-T01.cust.domain.net | non-Prod |
| NON-SAM-XEN-T01.cust.domain.net | Region2/PPMO |
| PRO-SAM-APP-01.cust.domain.net | Region3/PROD |
| PRO-SAM-APP-02.cust.domain.net | Region3/PROD |
| PRO-SAM-APP-03.cust.domain.net | Region3/PROD |
| PRO-SAM-APP-04.cust.domain.net | Region3/PROD |
| PRO-SAM-APP-05.cust.domain.net | Region3/PROD |
| PRO-SAM-APP-07.cust.domain.net | Region3/PROD |
| PRO-SAM-APP-08.cust.domain.net | Region3/PROD |
| PRO-SAM-BIZ-01.cust.domain.net | Region3/PROD |
| PRO-SAM-HUB-01.cust.domain.net | Region3/PROD |
| PRO-SAM-IHM-01.cust.domain.net | Region3/PROD |
| PRO-SAM-SQL-01.cust.domain.net | Region3/PROD |
| PRO-SAM-SQL-02.cust.domain.net | Region3/PROD |
| PRO-SAM-SQL-07.cust.domain.net | Region3/PROD |
| PRO-SAM-WAS-01.cust.domain.net | Region3/PROD |
| PRO-SAM-WEB-01.cust.domain.net | Region3/PROD |
| \\SAM\fsqnxt50\cfg1.cust.domain.net | Region0/BRC |
| \\SAM\fsqnxt50\dev.cust.domain.net | Region1/DEV |
| \\SAM\fsqnxt50\prod.cust.domain.net | Region3/PROD |
| \\SAM\fsqnxt50\test.cust.domain.net | Region2/PPMO |
| \\SAM\fstms50\prod.cust.domain.net | Region3/PROD |

Figure 17

SYSTEM AND METHOD FOR ASSURING CUSTOMERS DURING SOFTWARE DEPLOYMENT

CROSS REFERENCE TO RELATED APPLICATIONS

The present application claims benefit of U.S. Provisional Patent Application No. 62/251,315 entitled "System and Method For Assuring Customers During Software Deployment," filed Nov. 5, 2015.

BACKGROUND OF THE EMBODIMENTS

Field of the Embodiments

The present embodiments are generally directed to systems and processes for ensuring and validating the deployment of software.

Description of Existing Art

Current application installation processes are dependent on manual deployment and configuration modeling on an application by application basis using custom testing code, creating a higher probability of deployment and configuration errors. Further, while there exists in the art various processes for prerequisite testing of a target system's environment to validate that application-specific requirements are met thereby, such processes require interrogation of the target system by installation and execution of specific testing code. By way of example, U.S. Pat. No. 7,536,599 describes a pre-requisite checker, whereby validation tests are performed on the target system prior to application installation by way of testing code executed on the system. Similarly, U.S. Pat. No. 7,624,086 describes a pre-install compliance system that requires installation of an agent application on the target system. These prior art processes are limited in that they require individual testing code for each application. Depending on the number of applications for which prerequisite installation testing is required, there could be numerous different sets of testing code that must be independently executed prior to each application installation. Further by introducing and executing the testing code into the target system, additional issues may arise, such as conflicts with existing code. Such active interrogation using custom code is not optimal. A need remains in the art for a software deployment assurance process and system that maximizes use of existing target system software and hardware to provide information which may be used to assure users of the target system that new and/or existing software is and will execute properly within the target system.

By way of example, an industry facing particular challenges which could benefit from the present embodiments is the healthcare insurance industry. Insurance companies and other payers require continual management of complex computerized payment systems to reduce errors and maintain performance levels. This management is especially important during major changes such as: Upgrades, Implementations, Line of Business (LOB) changes, Enrollment periods, etc. Management of payer systems is very labor intensive and is highly manual, resulting in human error and increased costs. When problems arise, payers need a quick way to determine, among other things: What changed and where does everything reside? Is the system configured, installed, and integrated as designed? How are environments different?

Accordingly, the present embodiments recognize and address the need in the art for a solution that considers and balances: expense, portability, impact on target/destination systems, speed, extensibility of architecture, ease of integration and implementation, and reportability.

SUMMARY OF THE EMBODIMENTS

The present embodiments are directed to a Deployment Assurance Services (DAS) Toolkit, also referred to as DAS Accelerators, which bolsters customer confidence during a software deployment by creating a consistent, repeatable, traceable and fast process to deploy applications, report on functional usage and configuration and identify environmental issues before being released to the users. The DAS Accelerators allow the installer and its customers to discover, identify and catalog: infrastructure, application deployment, and environmental configuration parameters in a systematic and reportable manner.

BRIEF DESCRIPTION OF FIGURES

The Summary of the Embodiments, as well as the following Detailed Description, are best understood when read in conjunction with the following exemplary drawings:

FIG. 13 is an exemplary report snapshot of Audit data generated by the DAS Accelerators system in accordance with one or more embodiments described herein;

FIG. 14 is an exemplary snapshot of a Data Validation report generated by the DAS Accelerators system in accordance with one or more embodiments described herein;

FIGS. 15a-15b are exemplary snapshots of an Environment Validation Checklist report (FIG. 15a) and an output Environment Validation Issues report (FIG. 15b) generated by the DAS Accelerators system in accordance with one or more embodiments described herein;

FIGS. 16a-16e are exemplary snapshots of Environment Portfolio reports for a select Region and Environment of an exemplary customer environment generated by the DAS Accelerators system in accordance with one or more embodiments described herein; and FIG. 17 is an exemplary snapshot of a Server Listing for an exemplary customer environment generated by the DAS Accelerators system in accordance with one or more embodiments described herein.

DETAILED DESCRIPTION

Figure 1A:
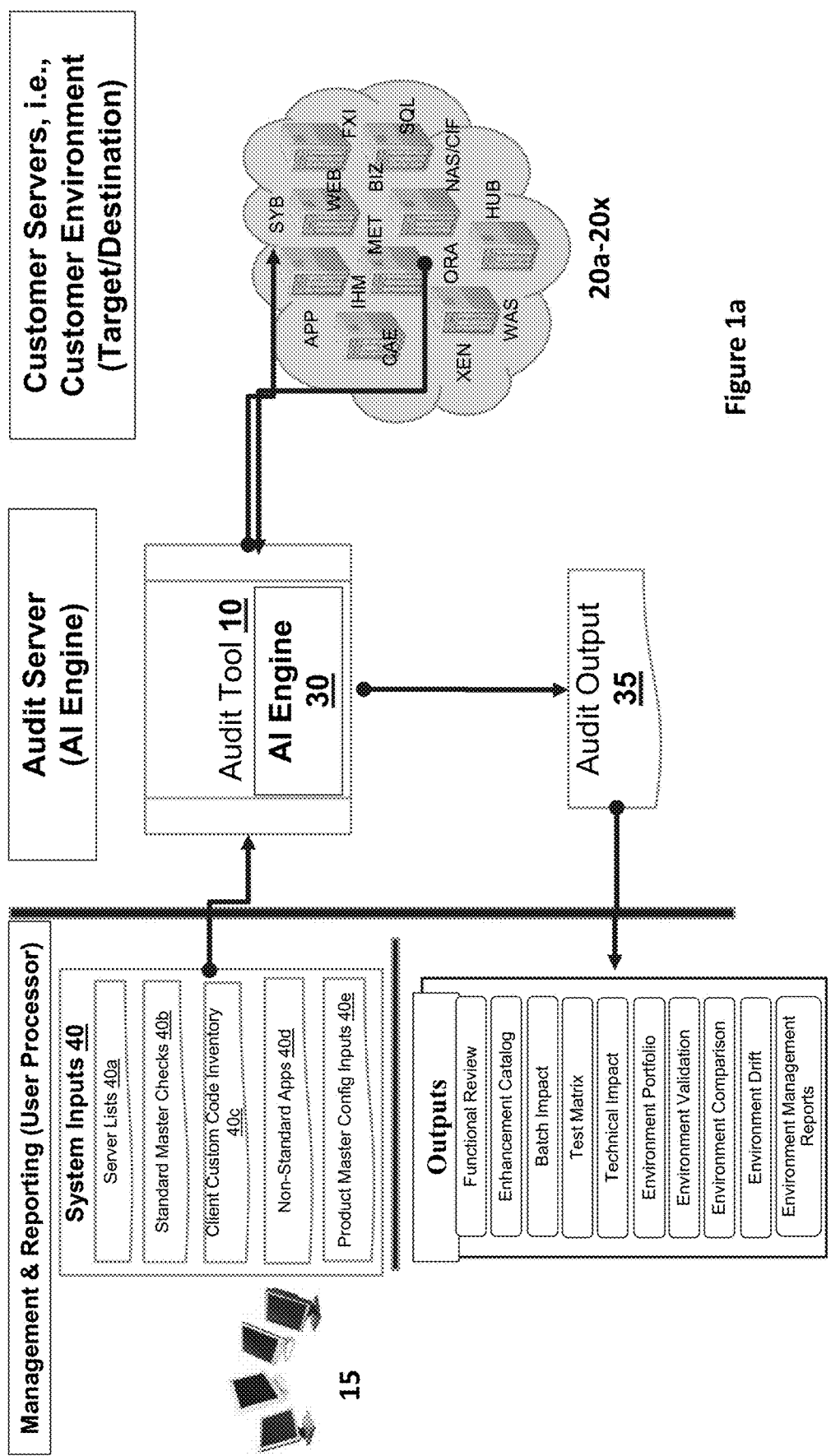
FIG. 1a is a schematic of the Deployment Assurance Services (DAS) Accelerators system in accordance with one or more embodiments described herein.

The DAS Accelerators ensure that there is a consistent, repeatable, traceable and fast process to perform: Deployment Planning including, Review how system is being used currently Identify and prioritize application modules for testing, Evaluate impact of new features, architecture review for new features compatibility; Initial System Build including Compare hardware and software deployed against application requirements and Review what core and ancillary software, and third party integrations were installed; Development, Deployment, and Migration including Configurations compared across each environment to standard, Custom code installed consistently and as designed Database storage is sized according to standards; and Upgrades and General Maintenance including Patches installed consistently and as designed, Code and configurations deployed and promoted consistently and Troubleshooting and identify configuration inconsistencies between environments or points in time In a first embodiment, the DAS Accelerators are developed to execute on a target/destination processor or collective processors (servers) meeting the following technical pre-requisites: DAS executable accessible; Server Input list accessible; Standard and Custom Check Type input list accessible; Windows Powershell 2.x or greater; .Net framework 2.x or greater; ODBC drivers (e.g., MS SQL Native client, Sybase, Oracle); and Dedicated service account with appropriate connection permissions to all destination systems. In a preferred solution, the target/destination processor includes: Microsoft PowerShell, ODBC driver and .csv flat files or a MS SQL database backend.

The DAS Accelerators use ODBC drivers and functionality to eliminate the need to write custom modules for each database platform to connect and execute queries. Once the appropriate ODBC drivers are installed on the execution server, the only code changes that need to be made and validated are to ensure that the connection strings are properly configured for each database platform, including, but not limited to, Sybase, MS SQL and Oracle. Oracle connectivity requires that pre-requisites be installed and enabled: Oracle Client 12.1 or greater; Oracle Data Provider for .NET; Oracle Provider for OLE DB; TNSnames.ora alias named DAS (Oracle databases only). DAS requires an independent alias created in tnsnames.ora file of the machine executing DAS that references the Oracle server to be audited.

The DAS Accelerators do not require any software agents to be installed or executed on any of the target/destination processors. In the present embodiment, all data gathering is done using the following standard Microsoft connection methodologies: File and directory information is gathered by connecting to CIFS file shares; Remote registry connections to gather registry names, counts, values and processor information; WMI queries to gather necessary information about services, physical disks, memory, DCom components and local group membership; Web page data is queried by using the .NET functionality to directly access a URL; DNS information is queried by using the .NET functionality to query the system DNS servers; and Domain security rights (Log on as Batch, Log on as Service) are queried using the GPResult command.

For security, in a preferred embodiment, the DAS Accelerators are assigned a dedicated service account ("DAS Service Account") that can be monitored and disabled when not in use. The DAS Service Account requires the following permissions on all destination systems, including servers hosting all DAS Accelerators and related software and ancillary software. For files and directories, Read only permissions are required on all files and folders and Read only permissions are required to each logical disk's Administrative share (C$, D$ . . . ). Similarly, Read only permissions to the Registry are required. This can typically be accomplished by making the service account a member of the Backup Operators group or assigning explicit permissions to the registry following the HKEY_LOCAL_MACHINE\SYSTEM\CurrentControlSet\Control\Secure PipeServers\winreg method. Additionally, Remote Enable permissions are required on the \root\cimv2 WMI Namespaces; Execute permissions are required for the .Net framework (Audit Workstation only); Read permissions are required on all DNS resolvers \zones; List contents and Read all properties are required in all queried Windows Domains; Access this computer (If specified in Group Policy) from the network is required on all domain controllers.

With respect to databases, Read only permissions are required on Master (Sybase and MS SQL), ALL USERS, sys.v_$temp_space_header, dba_temp files, sys.v_$temp_extent_pool (Oracle) and all DAS Accelerators' related and ancillary application databases. SSH connectivity is enabled by using publically available functions. This will allow the DAS Accelerators to connect to any Unix or Linux based system to gather additional information.

A generalized schematic of a system with communication and functionality flow in accordance with the embodiments described herein is shown in FIG. 1a. The Audit Tool 10, including Artificial Intelligence (AI) Engine 30, receives input from and delivers output to customer GUIs/interfaces, e.g., computers or processor screens, printers or the like, 15, in accordance with accessing and auditing customer's target/designated servers 20a-20x, i.e., customer's environment. One skilled in the art recognizes that a customer's environment may be extensive and may include multiple general purpose personal computers or processors (e.g., personal computers and/or laptop computers running various versions of Microsoft Corp.'s Windows™ operating systems) and/or workstation computers running any of a variety of commercially-available UNIX™ or UNIX-like operating systems and/or other electronic devices (e.g., network-enabled mobile devices) (hereafter and collectively, "processors"). These processors may include multiple applications including, but not limited to, database client and/or server and/or web browser applications.

The customer environment may include one or more internal networks and/or servers for communication with external networks, e.g., the Internet or other private external networks. The customer environment may also include one or more server processors (hereafter and collectively "servers"). Each server in turn running one or more applications in accordance with its designated use, e.g., web server, application server, database server, and the like.

Specifics of the generalized system and functionality of FIG. 1a are discussed further herein below, as well as particular exemplary implementations shown in FIGS. 2a and 2b.

Figure 2A:
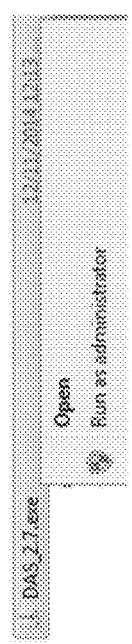
FIGS. 2a and 2b are exemplary screenshots for accessing and launching the DAS Accelerators system in accordance with one or more embodiments described herein.
Figure 2B:
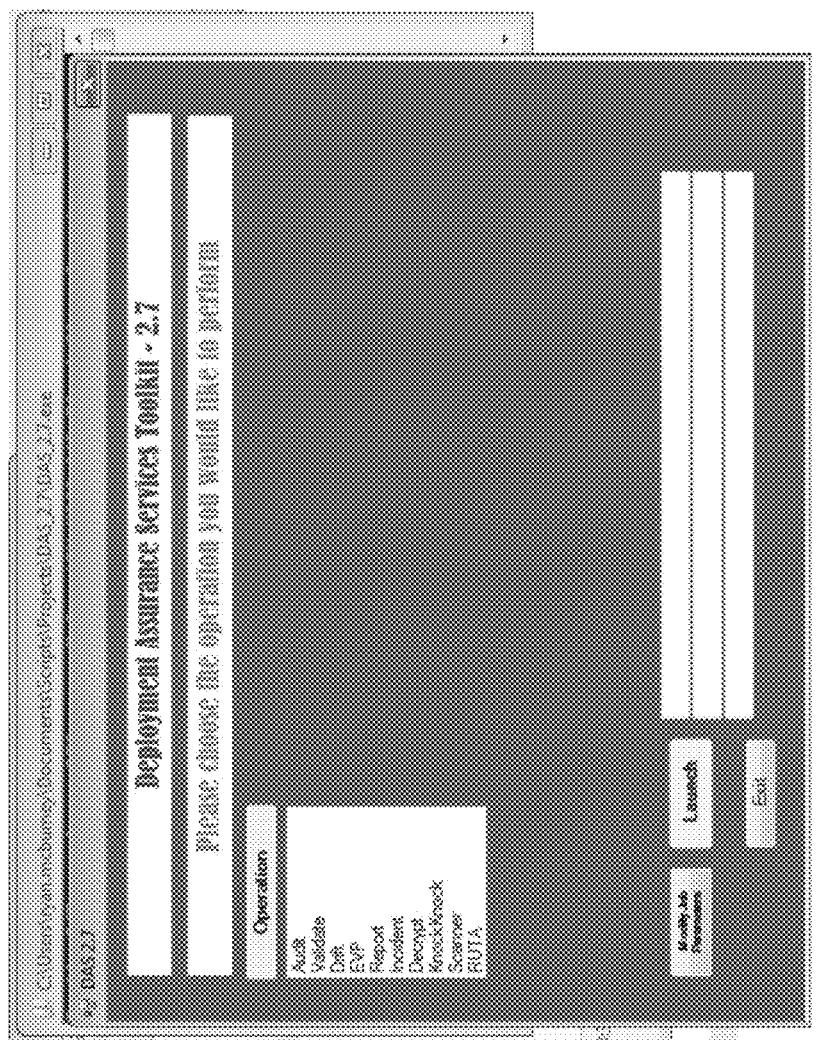

Referring to FIG. 2b (discussed below), the GUI window for the DAS Accelerators includes a notification bar informing users as to what additional information (if any) they need to provide before being able to launch the DAS Accelerators' functionality. Once the prerequisites for an operation are completed, the Launch button is made active for user selection. There are three fields at the bottom of the window that give users status updates as DAS executes.

The DAS Accelerators include an Artificial Intelligence (AI) engine to facilitate the Audit operations. Instead of asking users to tell the accelerator what it should be auditing for on the target/destination servers, the AI engine allows the DAS Accelerators to examine the destination to determine: usage, hardware, software, components and configuration. The accelerator matches the data result it finds on each source (destination server) against the included entries in the standard and custom inputs to "enable" the categories of operations. Operations can be enabled by either a specific match of each of the following Categorization fields: Operational, Application, Custom, and Database. Classification Fields: Hardware, Product, Configuration. Sub-Classifications: Hardware; Processor. Product; Core, Version, Type, Role, etc. In addition to the standard input list, DAS is designed to allow the users to create their own custom input list to add to or amend the Categories, Classification and Check Types. Combining this with the ability to define their own Operational Categories and Classification and Check Types, DAS has the ability to extract and report on data for virtually any application or component.

'Include' entries are able to define unique categorizations based on: Applications being installed (listed in Programs and Features), windows service (present), file existence (Local or NAS based path) or a database name. File based includes will search all available drive letters to match the path given.

All functions that utilize hashes are using FIPS compliant SHA1 hashing algorithms within the .Net framework. This was done to ensure compatibility with any customers enforcing FIPS compliance on their systems.

Figure 1B:
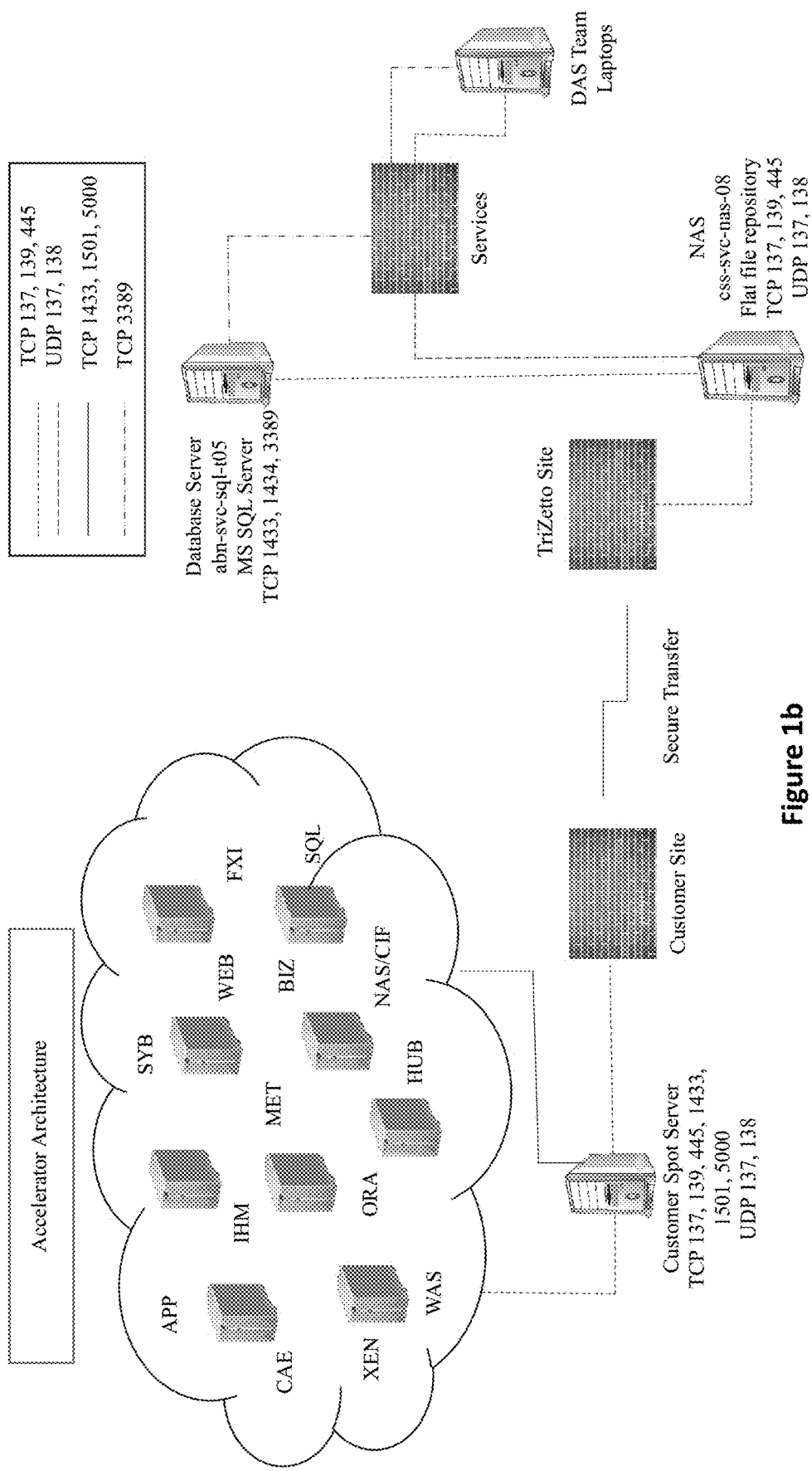
FIG. 1b is a schematic of the Deployment Assurance Services (DAS) Accelerators system in accordance with a first particular exemplary embodiment described herein.

A DAS accelerator in an exemplary licensed embodiment described herein is built on a Hub and spoke model. In this first exemplary licensed embodiment shown in FIG. 1b, one server is designated as the DAS (SPOT) collection node and it connects to and collects from one or more destination systems. These collections happen over a number of ports, based on the Operating System and applications installed. Clients upload encrypted output files onto a secure transfer site, where the licensor's DAS team moves the outputs to a NAS (Non-accessible Server). These encrypted output files are then picked up by an automated process and loaded into a database for decryption, analysis and reporting.

All windows connections are performed using the standard Microsoft connection ports—TCP 137, 139, 445, and the dynamic RPC ports All Linux connections are performed using the standard ssh port—TCP 22

By default, all connections to SQL server are made using the credentials of the user executing Rover on TCP 1433. A custom port can be substituted as required by the destination system.

By default, all connections to Oracle are made to the default port of TCP 1521, and user credentials must be specified via the command line. A custom port can be substituted as required by the destination system.

By default, all connections to Sybase are made to the default port of TCP 5000, and user credentials must be specified via the command line. A custom port can be substituted as required by the destination system.

Figure 1C:
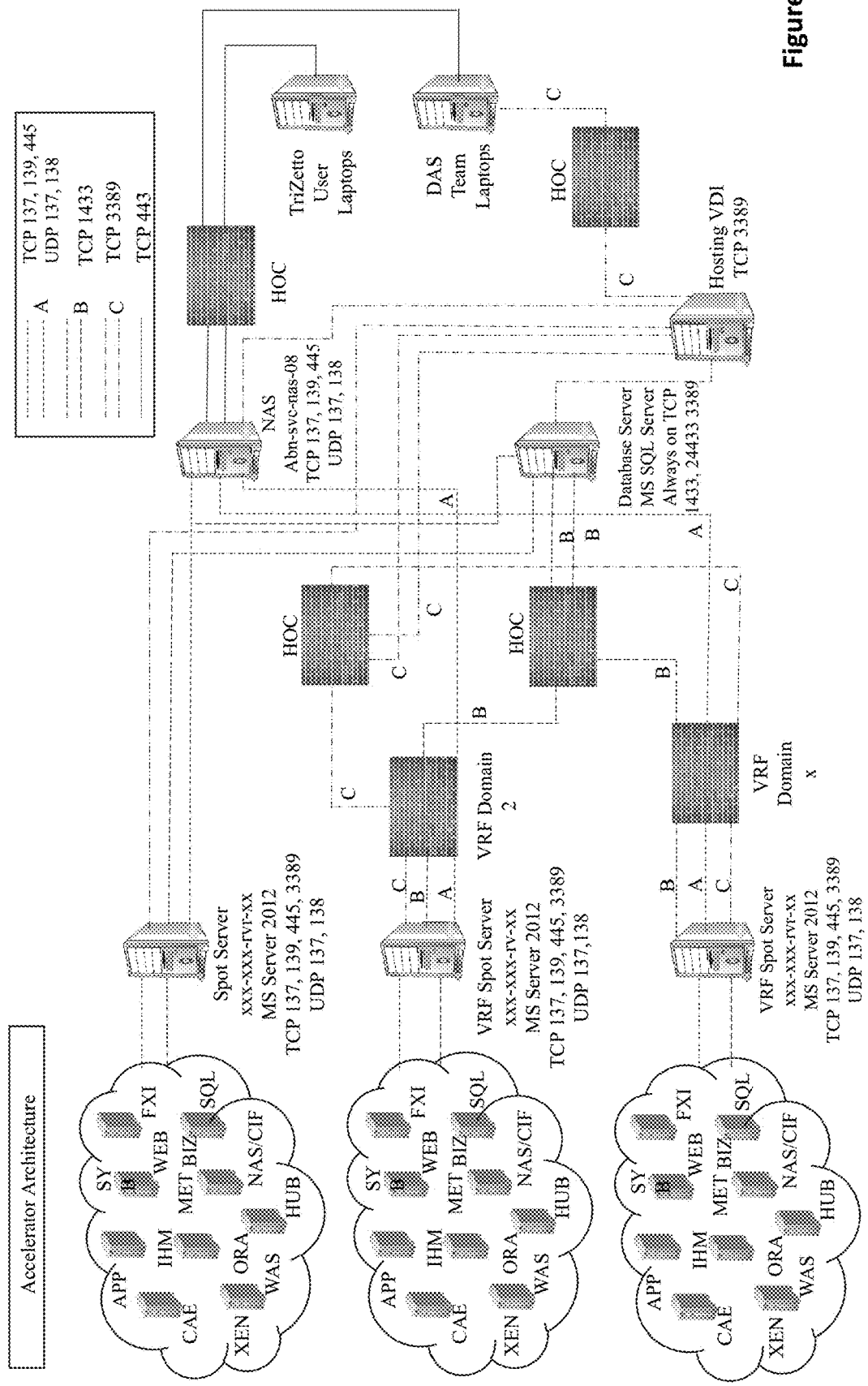
FIG. 1c is a schematic of the Deployment Assurance Services (DAS) Accelerators system in accordance with a second particular exemplary embodiment described herein.

A DAS accelerator in an exemplary hosted embodiment is built on a Hub and Hub and spoke model. In this second exemplary hosted embodiment shown in FIG. 1c, one server is designated as the DAS (SPOT) collection node and it connects to and collects from one or more destination systems. This node downloads the input files and uploads the outputs to a NAS (css-svc-nas-08). These output files are then loaded into a database (abn-svc-sql-t05) for reporting and analysis. Additionally, connectivity to the database server (TCP—1433) is required by both hubs to generate the standard and custom reports. The Outer Hub (Spot) node connect to the NAS using the standard CIFS ports ports—TCP 137, 139, 445 and the Database server using TCP 1433. The collections happen over a number of ports, based on the Operating System and applications installed.

All windows connections are performed using the standard Microsoft connection ports—TCP 137, 139, 445, and the dynamic RPC ports All linux connections are performed using the standard ssh port—TCP 22

By default, all connections to SQL server are made using the credentials of the user executing Rover on TCP 1433. A custom port can be substituted as required by the destination system.

By default, all connections to Oracle are made to the default port of TCP 1521, and user credentials must be specified via the command line. A custom port can be substituted as required by the destination system.

By default, all connections to Sybase are made to the default port of TCP 5000, and user credentials must be specified via the command line. A custom port can be substituted as required by the destination system.

Table 1 below provides port specifications:

TABLE 1

| Source | Destination | Port(s) | Purpose |
| --- | --- | --- | --- |
| Spot Server | Customer Servers | TCP 22, 137, 139, 445, 3389, 5000, 1501, Custom DB Ports, Dynamic RPC UDP 137,138 | Data Collection |
| Spot Server | Database server | TCP 1433 | EvP, Reports |
| Spot Server | NAS | TCP 137,139,445 UDP 137,138 | Flat file generation Configuration Management |
| Database Server | NAS | TCP 137,139,445 UDP 137,138 | Import flat files Configuration Management |
| Reporting Server | NAS | TCP 137,139,445 UDP 137,138 | Configuration Management |
| Reporting Server | Database server | TCP 1433 | SSRS reports |
| DAS Team | Spot server | TCP 3389 | Management |
| DAS Team | Database server | TCP 3389 | Management |
| DAS Team | Reporting server | TCP 3389 | Management |
| DAS Team | NAS | TCP 137,139,445 UDP 137,138 | Flat file management |

Referring again to FIG. 1a, the DAS Accelerators' audit functionality performs a sequential audit of each server listed in the customer's server input list 25. Initially, the AI engine 30 scans each server to match all required Include entries, which enables Check Types and Classifications of each specific Category. Once the Check Types is enabled, the audit executes sequentially and after each server completes, the audit results 35 are output to an encrypted file, ready for import into the database and decrypted. Audits review hardware, software, registry, integration and configuration details from customer servers for, e.g., the purpose of validating fitness for use.

Figure 4:
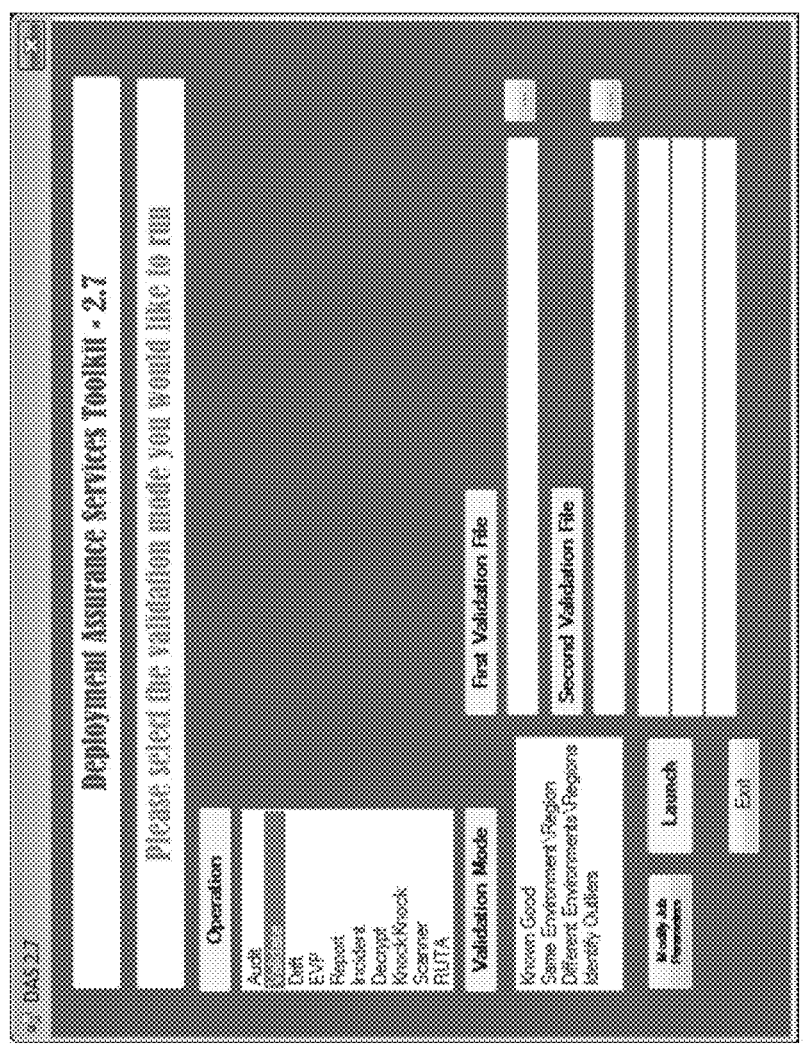
FIG. 4 is an exemplary screenshot related to a Validate operation of the DAS Accelerators system in accordance with one or more embodiments described herein.

The DAS Accelerators' technical validation functionality can be run in four different modes as discussed below. In Single mode, the Accelerator audit engine reviews a single result set and determines outliers. This mode analyzes a single data set by comparing the results for each Check Point and Classification, and highlights when one or more servers has a unique value. This validation mode is shown in the screenshot of FIG. 4 as "Identify Outliers".

In Multi-mode, the Accelerator audit engine reviews two or more datasets against each other. This mode compares different result sets which contain similar classifications, on unique servers and highlights variations across the datasets. This validation mode is shown in the screenshot of FIG. 4 as "Different Environments\Regions".

In a Baseline mode, the Accelerator audit engine reviews one or more datasets against a "Baseline" or "Known Good" dataset. This mode compares different datasets which contain similar classifications, on unique servers and highlights variations against a Baseline dataset. This validation mode is shown in the screenshot of FIG. 4 as "Known Good". This can also be referred to as a Gold Standard comparison.

In a Drift mode, the Accelerator audit engine reviews the same dataset against two points in. This mode compares two dataset collected over two different points in time and returns all of the values that are different. This validation mode is shown in the screenshot of FIG. 4 as "Same Environment\Region".

The DAS Accelerators' EvP function creates an environment portfolio, which is an overview of the environment(s) contained in the Audit result set. The environment portfolio can be output as an Excel workbook that contains separate worksheets (tabs) as discussed below.

The Solutions Suite worksheet contains a high level overview of specific application suites that are installed, organized by region \environment. The list of application suites included in this list can be customized by adding Sol Suite entry to the standard or custom check list.

The Solutions Suite by Host worksheet contains a detailed list of key identified applications and versions by server. This worksheet also indicates whether each server was online or offline when the audit was executed.

The Database worksheet contains a detailed list of each database running on each database server. Additionally, this worksheet reports on the application-specific or application provider-specific storage space allocated, storage space utilized, log space allocated and log space utilized with each database.

The Hardware worksheet contains a detailed list of the key infrastructure details for each server. This key infrastructure detail includes Make\Model, processors, RAM, OS, IP address and custom database ports.

The Software by Host worksheet contains a complete list of every application listed in programs and features for every server.

The DAS Accelerators' incident functionality is a targeted listing of key files and configurations that have changed in key application folders within the last 7 days.

The DAS Accelerators' "KnockKnock" functionality is a quick ping sweep of the servers in a server list to determine whether they are online.

The DAS Accelerators' Scanner functionality is a utility to discover additional servers that may not be included in the originally input server list. The Scanner functionality connects to an Active Directory Domain controller and extracts a list of all active computers, DNS Host (A) records and DNS CName (C) records from the directory. Any servers not in the original server list are added with an environment label set to the date of Scanner execution. This functionality must be enabled for each execution and is not intended to run in a persistent state.

The DAS Accelerators' RUTA (Rapid upgrade transactional analysis) functionality is used to perform a functional and configuration data extraction and create an initial draft of a Functional Review artifact used in application-provider specific upgrades. By way of example, software provider, TriZetto Corporation, uses RUTA to improve its software upgrade process. Exemplary embodiments of the RUTA process are described in co-owned U.S. Pat. No. 9,152,386 entitled "METHOD AND SYSTEM FOR RAPID UPGRADE THROUGH TRANSACTIONAL ANALYSIS," the contents of which is incorporated herein by reference in its entirety. The RUTA Accelerator leverages the audit functionality, and a specific check list containing the RUTA specific databases to query by product and platform. By leveraging the audit functionality, database connectivity to virtually any database platform is achieved. Once the data extraction is complete, an Excel (or other tabular) workbook is created containing separate worksheets (tabs) as discussed below.

The Functional Review Scorecard worksheet contains counts of queries analyzed and applications utilized. Configuration reporting counts of tables analyzed and tables utilized.

The Functional Review worksheet contains counts of data relating to product usage.

The Configuration Report worksheet contains counts of data relating to product configuration.

The Customer Answers worksheet contains customer's answers to product usage inquiries gathered from a customer engagement event. These values are used to populate a usage column in the Functional Review tab, to allow for easy identification of deltas (differences).

The Raw Data worksheet provides detailed query results that allow a technical reviewer, e.g., from the software provider, to clarify the functional review deltas (differences) for the customer.

The Enhancement Scorecard worksheet provides counts of total enhancements, total dependent enhancements, total independent enhancements, enhancements that apply to client (customer) and enhancements that do not apply to client (customer). Totals of in scope items for upgrade and totals out-of-scope items for the upgrade are also provided.

The Enhancement Inventory worksheet provides a complete list of enhancements from customer's current version of software to upgraded software.

The DAS Accelerators logging functionality is used to create statistics around DAS Accelerator execution. The statistics created include: Total number of audits run; Total number of servers audited; Number of unique servers audited and total; and Number of Check Points triggered.

Further to the audit functionality described above, specific features of the audit functionality are described in Table 2.

TABLE 2

| Audit Type | Description |
|---|---|
| Registry | Get value of single registry key; Get list of child registry keys; Get values from child registry keys; Get a count of child registry keys |
| Installed Applications | Installed applications are compiled by gathering all 32 & 64 bit software registered in the registry and returning the application name, publisher and version. |
| Disks | Information about the physical disks is gathered by using a WMI query. DAS gathers and returns the following information about all local "Fixed" disks: The drive letter assigned, space allocated, space free, and space used. |
| Memory | Gathers and returns the total amount of memory recognized by the OS, using a WMI query. |
| Security Groups | Gathers and returns all users and groups that are members of the local administrators group, using a WMI query. |
| File Existence | Performs a scan of all physical disks or defined NAS paths to determine if a file is present in a specified path. |
| File Count | Performs a scan of all physical disks or defined NAS paths and returns a count of number of files in a specified path. |
| File Content | Performs a scan of all physical disks or defined NAS paths to identify all instances of the specified path\file. It then returns all lines from each file that match the search criteria. |
| Services | Returns a list of all services whose name matches the name specified |
| COM | Performs a remote COM+ query to retrieve COM object properties. This feature has not been implemented due to the COM+ Network Access feature not being installed on TriZetto hosted systems. |
| Database | Returns up to 10 columns of data from virtually and database platform by using ODBC drivers to establish connectivity. Key database information that is collected for every Audit operation are: Database name, allocated and utilized size, as well as collation settings. Connections to Sybase and Oracle databases can be performed using alternate credentials. DAS is able to execute virtually any query on any table that the account used to establish the connection has permissions to. |
| Windows Features | This gathers a list of the installed Windows roles and features. This feature has not been enabled as the servers hosted by TriZetto do not have PowerShell Remoting enabled. |
| Permissions | This returns either a numeric or text value describing the permissions on the specified file or folder. |
| Security | Returns the list of the user accounts granted the Log on as service right and the Log on as batch right by using GPResult. |
| DCOM | Gathers the properties of all DCOM components via a WMI query and then returns the properties for the specified component. |
| Folder list | Gathers a list of the following properties for all files in the specified folder by enumerating the properties of each file: File name, Product version number, Modified Data and file size in KB. |
| ODBC | Gathers information about the ODBC drivers installed on each system. This feature has not been implemented. |
| Connectivity | The connectivity module leverages the .NET framework to verify that a server is accepting ping connections or on a specified port. |
| HTTP/S | The HTTP/S module leverages the .NET framework to connect to the specified URL and returns either a successfully connected message, or the error message from the web server. |
| XML | The XML module loads the XML file and returns the data from the node or element that matches the specified data |

With continued reference to FIG. 1a, the system inputs 40a-40e to the audit engine 30 include Server list 40a and Standard and Custom Input 40b-40e (e.g., Standard Master Checks, Client Custom Code Inventory, Non-Standard Apps and Product Master Config Inputs).

The Server list 40a is a comma delimited collection of the known servers to be audited and the environment\region in which they should be associated with. There are no restrictions on the number or names of environments \regions. Custom database ports are declared by appending a ":" and the port number to the server name. By way of example, a typical entry would look like "Servername,Region" and a database server with a custom port would look like "Servername:Port,Region". The check list and custom checklist are used to define Category, Classification to be performed as well the conditions for each Check Type to be included. The DAS accelerator performs a hierarchical match on the following values from the Input files: Server Inventory, Category, Classification and Check Type. Analysis of the datasets can be limited to a specific Categories, Classifications or Check types.

The outputs 45 from the audit engine 30 can include: Enhancement Catalog; Batch Impact; Test Matrix; Technical Impact; Audit Results, Environment Portfolio (EvP); Functional Review (Usage); Environment Validation, Environment Comparison, Environment Drift and Reporting (e.g., Environment Management Reports) discussed below.

The primary output from DAS Accelerators is the raw data produced by the Audit function. The Audit function output contains the results of every check executed against each server. This output can be consumed by other DAS Accelerator functions, such as the Validate, EvP, Drift and RUTA. This Audit function output can be produced as either an encrypted flat file, a csv file or written to a SQL database.

The functional review is generated by consuming the results of the Audit function when executed using the RUTA checklist. The Functional Review may be an Excel (or other tabular) document with a summary, functional review, configuration report, customer answers and raw data tabs (worksheets). Specific Functional Review output worksheets are described above.

The DAS Accelerators create the following standard reports: Monthly environment QA statistics; Audit Validation Outputs; Drift; Environment Portfolio; and Functional Review. Additionally, Ad-Hoc reports may be implemented with the use of an SQL Server backend. Such reporting may be instituted and used by both the Customer and by specific application providers, e.g. software providers, responsible for installing or upgrading some or all of the customer environment. Accordingly, the standard report list may be expanded to include: Custom Code component verification; Application DLL verification; Performance tuning reports; Configuration trends across multiple clients (customers); pre-emptive issue identification across multiple clients (customers). With respect to Ad-Hoc reports, or customer-specific reports, these may include: customer specific software configuration reports; customer provided code verification; and customer environmental health.

FIGS. 2 through 12 include interface GUI screenshots for launching and executing various features and functionality of embodiments of the DAS Accelerators described herein.

In FIG. 2a, the DAS Accelerators may be launched by clicking on the DAS_2.X.exe executable, and selecting Run As Administrator. In FIG. 2b, a PowerShell window opens to display the UI, whereby a user may select from the operations listed in the Operation Selection window. Upon selection of a specific Operation, the required fields for each operation will be presented for completion.

Figure 3:
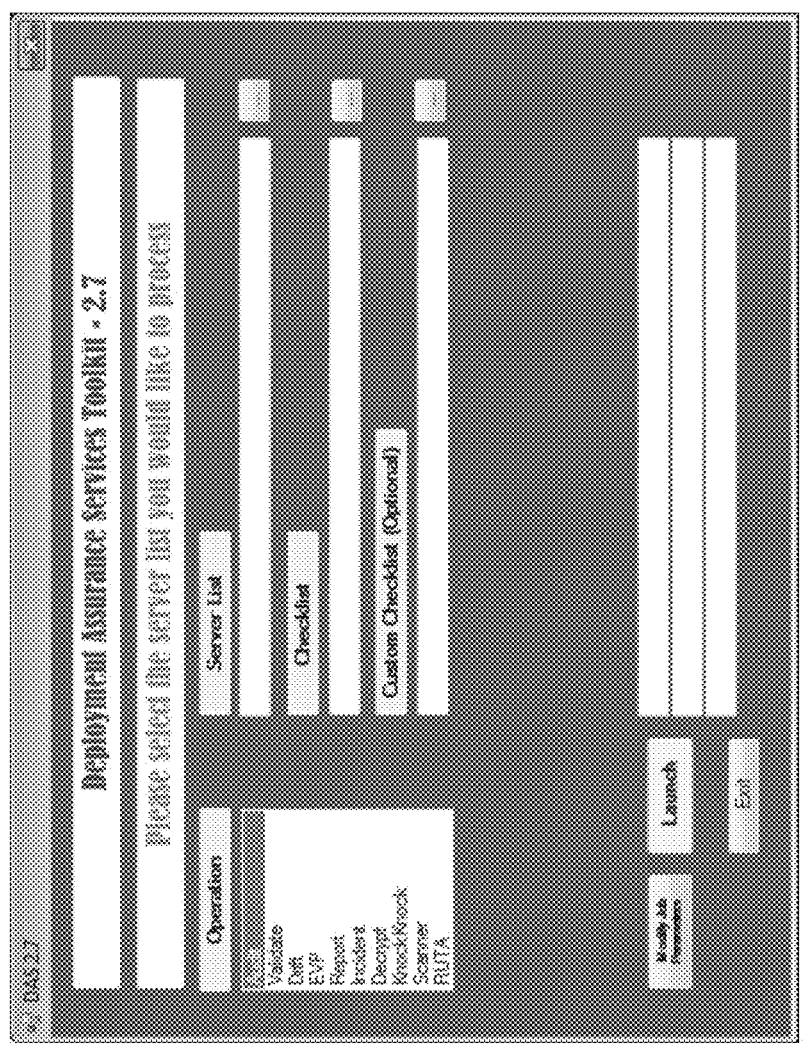
FIG. 3 is an exemplary screenshot related to an Audit operation of the DAS Accelerators system in accordance with one or more embodiments described herein.

FIG. 3 provides an exemplary Audit Operation UI which includes selection fields for: Server List; Checklist; Custom Checklist (Optional).

FIG. 4 provides an exemplary Validate Operation UI which includes additional selection fields for: Validation Mode; First Validation File; and Second Validation File. The selections vary in accordance with selection of Validation Mode.

Figure 5:
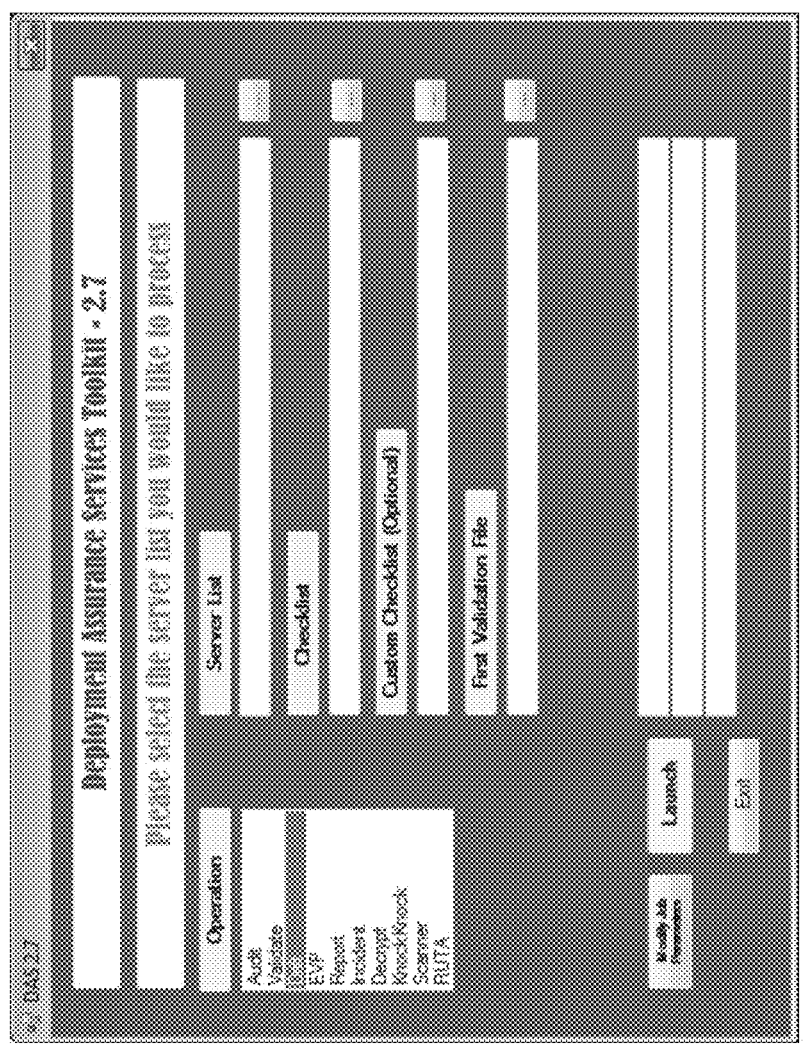
FIG. 5 is an exemplary screenshot related to a Drift operation of the DAS Accelerators system in accordance with one or more embodiments described herein.

FIG. 5 provides an exemplary Drift UI which includes additional selection fields for: Server List; Checklist; Custom Checklist; and First Validation File.

FIG. 5 provides an exemplary Drift UI which includes selection fields for: Server List; Checklist; Custom Checklist; and First Validation File.

Figure 6:
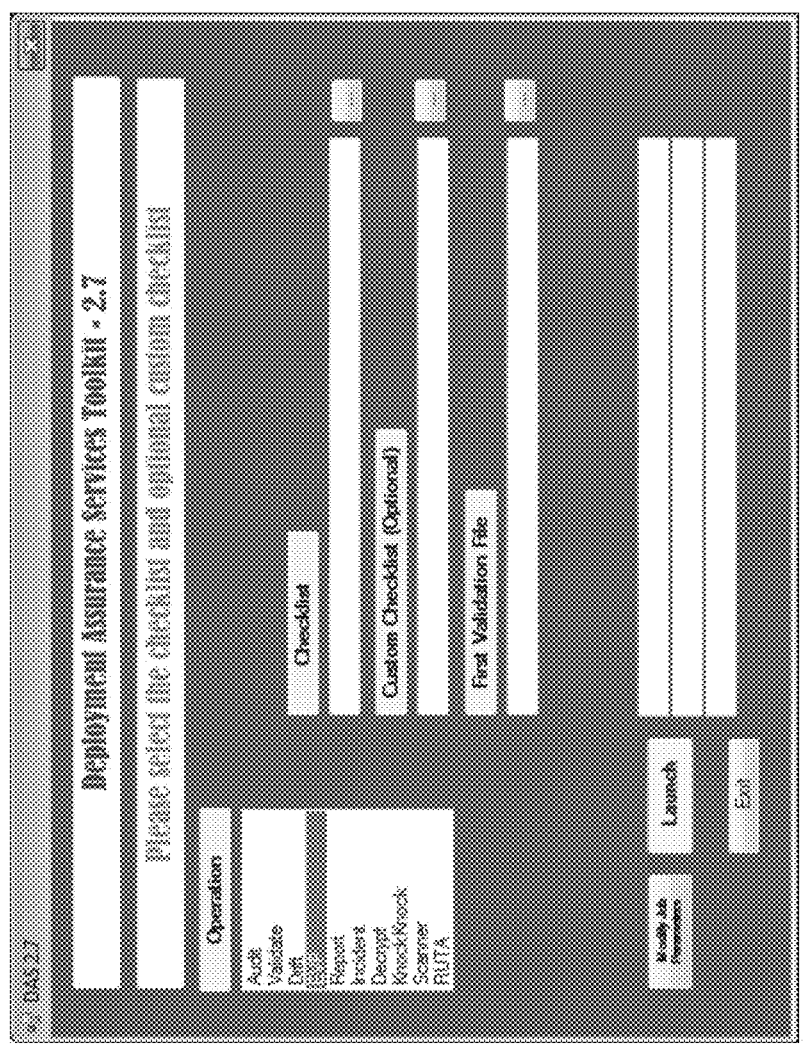
FIG. 6 is an exemplary screenshot related to an EvP operation of the DAS Accelerators system in accordance with one or more embodiments described herein.

FIG. 6 provides an exemplary EvP UI which includes selection fields for: Checklist; Custom Checklist; and First Validation File.

Figure 7:
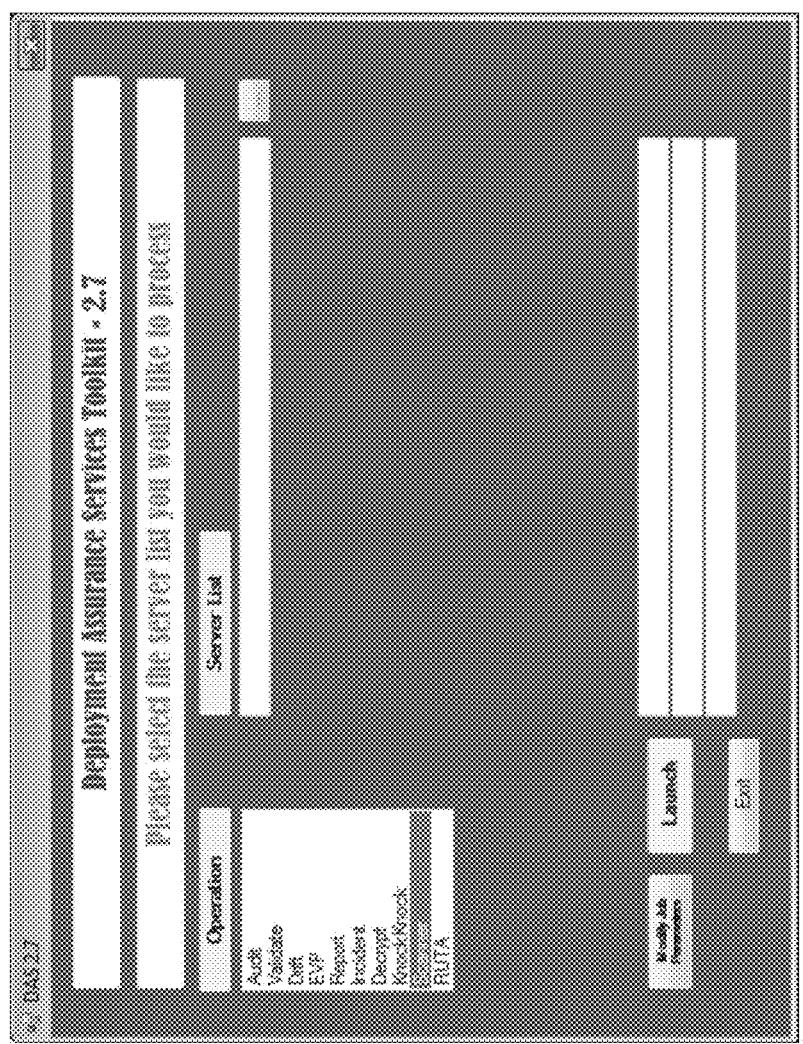
FIG. 7 is an exemplary screenshot related to a Scanner operation of the DAS Accelerators system in accordance with one or more embodiments described herein.

FIG. 7 provides an exemplary Scanner UI which includes a selection fields for: Server List.

Figure 8:
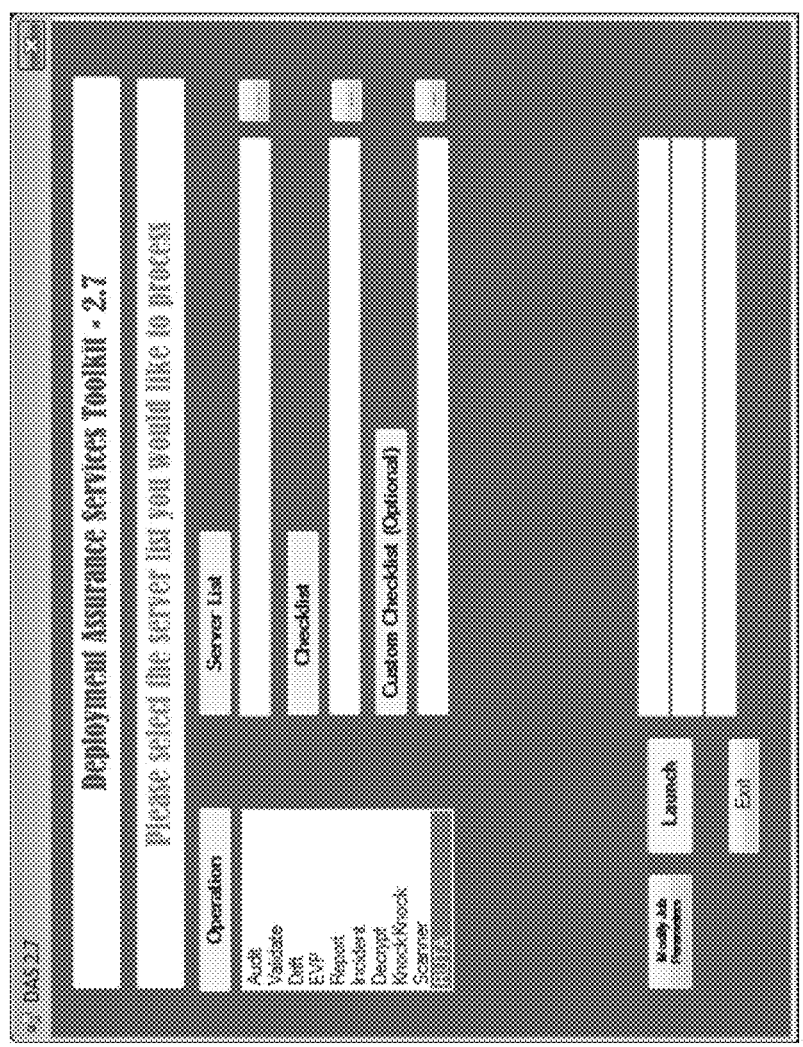
FIGS. 8-10 are exemplary screenshots related to a Rapid Upgrade Through Analysis (RUTA) operation of the DAS Accelerators system in accordance with one or more embodiments described herein.

FIG. 8 provides an exemplary RUTA UI which includes selection fields for: Server List; Checklist; Custom Checklist.

Figure 9:
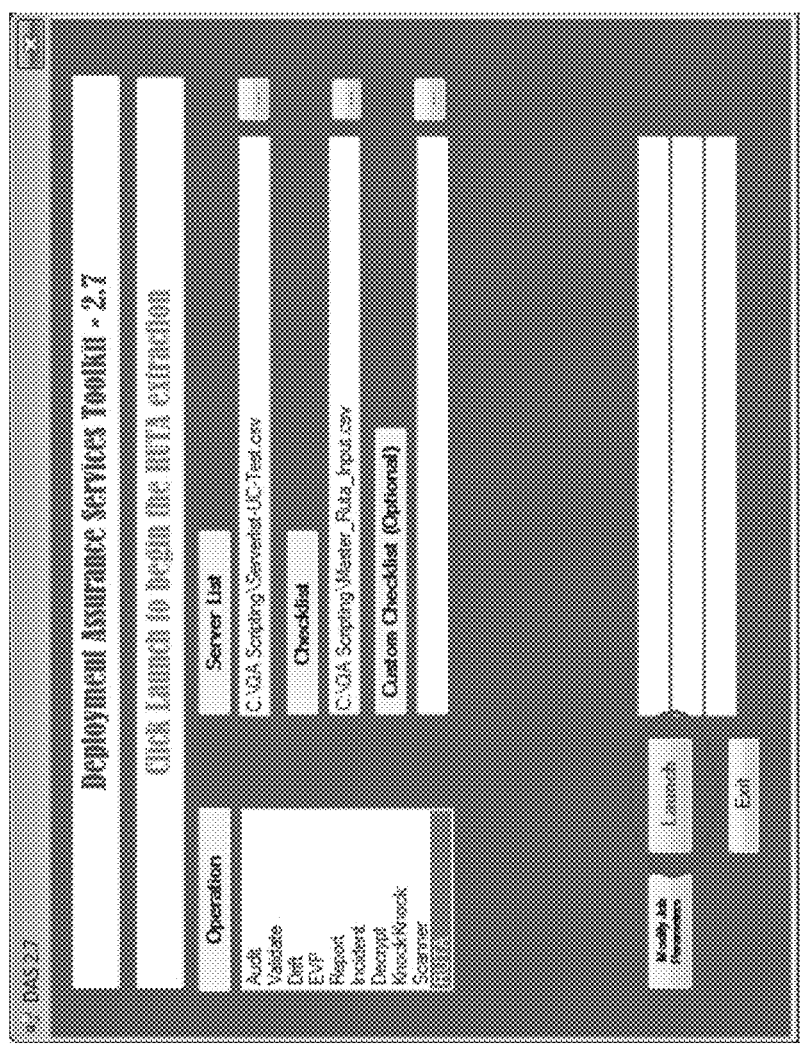
Figure 10:
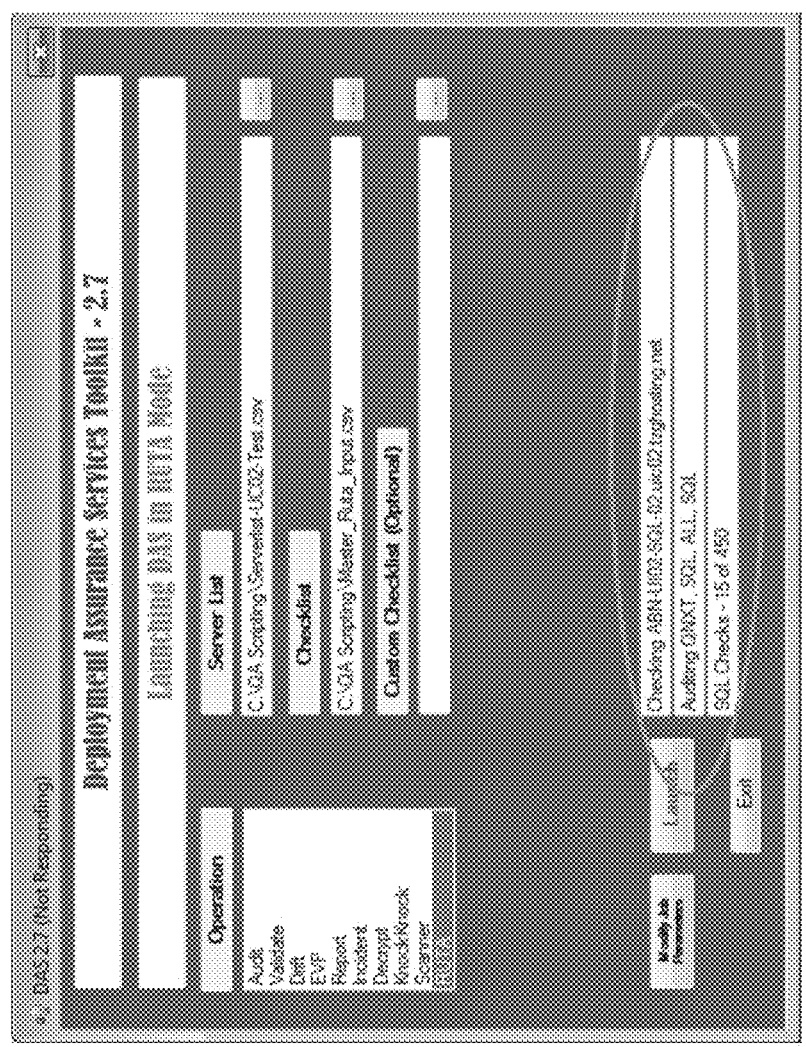

Once all prerequisite fields have been populated for a particular Operation, the Launch button will be enabled as shown in FIG. 9 for an exemplary RUTA launch. Clicking on the Launch button will execute the Operation selected. During execution of the launched Operation, Status messages will be displayed in the Status Message Area as the operations run as exemplified in the UI of FIG. 10.

All UI Selections can be specified using the command line as follows, wherein the entire list of command line parameters must be enclosed in single quotes, e.g.: .\DAS_2.7.exe '-svrlst C:\QA Scripting\Serverlist-UC02-Test.csv-op Audit - chklst c:\QA Scripting\QA_Master_Validation Point_V2_ Input.csv -silent true'. Selections include: Operation -Op Operation (e.g., Audit, Validate, Drift, EvP, etc.); Server list -SvrLst Path to server list; Check list -Chklst Path to check list; Custom Check list -CustomChklst Path to custom check list; Validation Mode -Mode ValidationModeNumber; Validation \Drift File -File1 Path to First Validation File; Second Validation File -File2 Path to Second Validation File; and Validation Map File -File3 Path to Validation Map File. To have a completely automated command line execution the "-Silent $True" parameter must be present.

Figure 11:
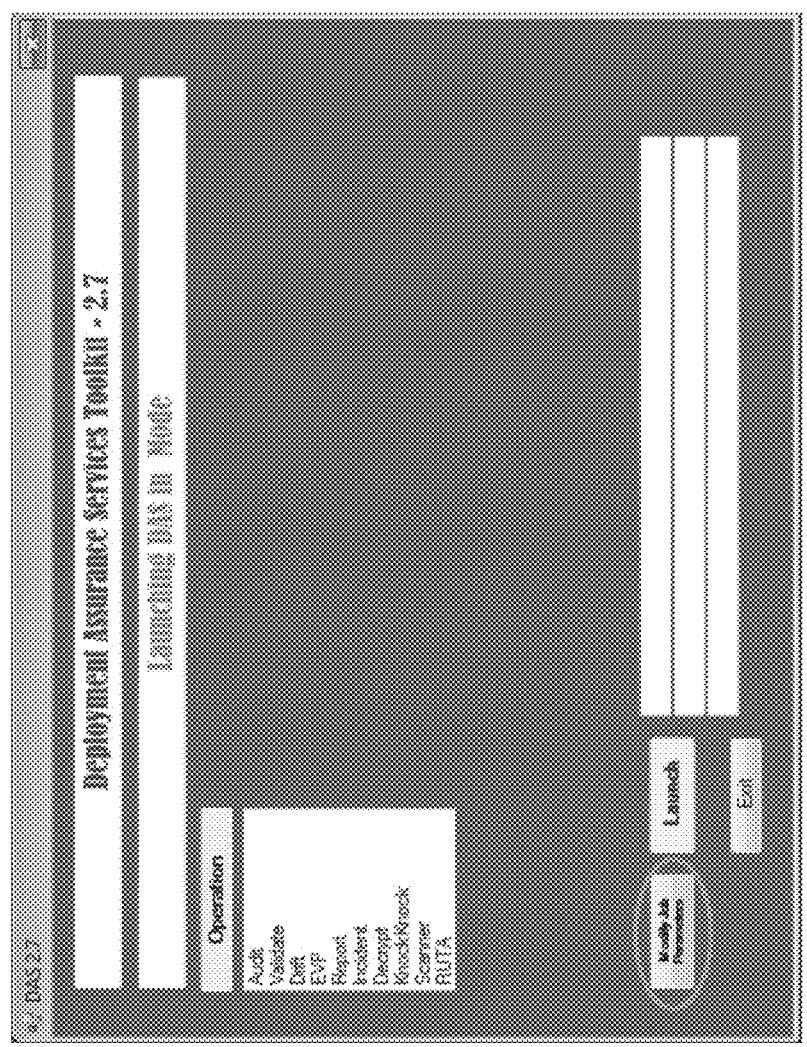
FIGS. 11-12 are exemplary screenshots related to a Job Parameter Modification function of the DAS Accelerators system in accordance with one or more embodiments described herein.
Figure 12:
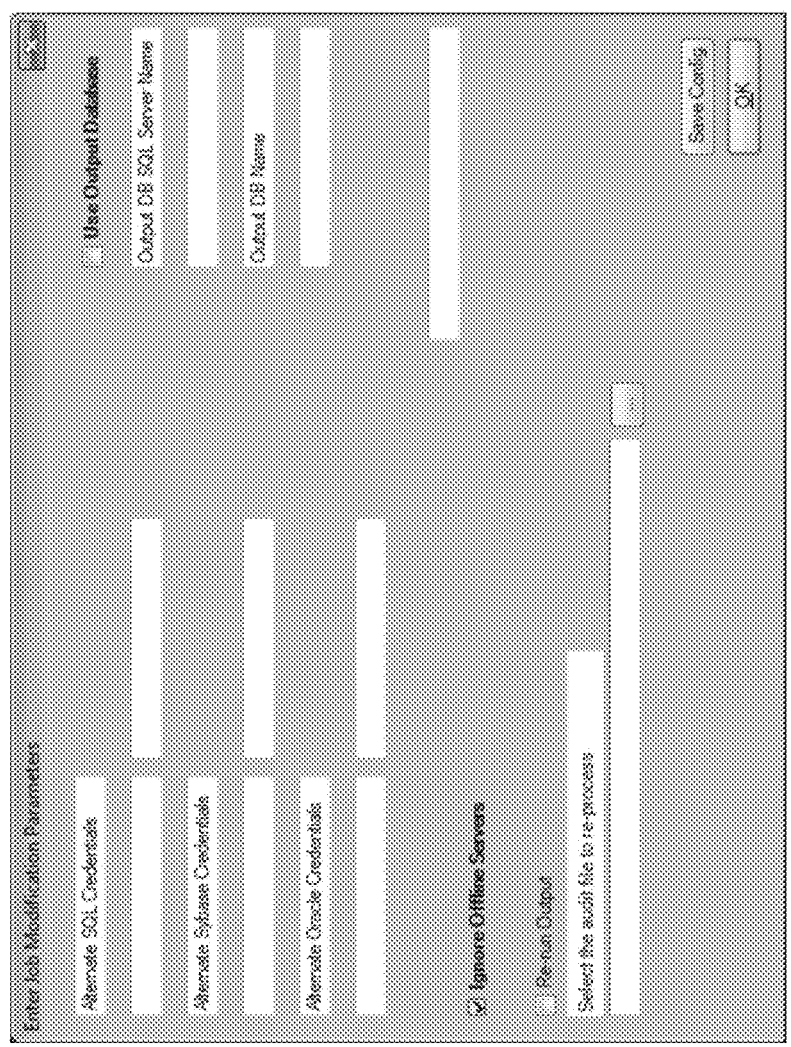

Referring to FIG. 11, customized run parameters can be set and saved by clicking the Modify Job Parameters button, which results in the screen at FIG. 12. On this screen, the following job modifying parameters can be set: Alternate SQL Credential where user specifies a username and password to make all SQL Server database connections with; Alternate Sybase Credential where user specifies a username and password to make all Sybase database connections with; Alternate Oracle Credential where user specifies a username and password to make all Oracle database connections with; Ignore Offline Servers where unchecking will allow DAS Accelerators to run all checks that the AI engine enabled even if the server fails to respond to the Ping health check (this feature is helpful when connecting to remote servers across a VPN that does not allow for Ping); ee-run Output where checking will allow the EvP and RUTA functions to reprocess the existing audit file specified in the following file selection text box; Use Output Database where checking will allow DAS Accelerators to write its output to a SQL database specified in the following fields; Output DB SQL Server Name where user provides the name of the Database server to store DAS Audit results to (does not need to be a fully qualified server name, but the name specified must be resolvable by the executing system); and Output DB Name where user provides the name of the Database on the Database server where DAS Accelerators result will be stored.

FIGS. 13-17 provide snapshots of exemplary results and reports generated as outputs from the audit engine for an exemplary TriZetto Corporation customer. The exemplary customer has previously installed a TriZetto Corporation product suite referred to as QNXT, which is a core administrative system for facilitating the healthcare-related claims processing. FIG. 13 provides a snapshot of the output Audit results data generated by an AI Engine for the exemplary customer's system. An extensive exemplary output Audit data report can be seen in the "Audits-SAM_QNXT5x_ConvertText" Table submitted herewith and incorporated herein by reference.

FIG. 14 provides a snapshot of the output Data Validation report generated by an AI Engine for the exemplary customer's system using the Audit results data from FIG. 13. An extensive exemplary output Data Validation data report can be seen in the "Data-Validation-SAM_QNXT5x_ConvertText" Table submitted herewith and incorporated herein by reference.

FIGS. 15a and 15b provide a snapshot of the output Environment Validation Checklist report (FIG. 15a) generated by an AI Engine for the exemplary customer's system using the Audit results data from FIG. 13 and an output Environment Validation Issues report (FIG. 15b).

FIGS. 16a-16(e) provide a snapshot of the output Environment Portfolio reports generated by an AI Engine for the exemplary customer's system using the Audit results data from FIG. 13. The report snapshots are for Region 0, Environment BRC. Other Regions and Environments are not illustrated. FIG. 16a is an Environment Portfolio report snapshot for Region 0, Environment BRC at the Solutions Suite level. FIG. 16b is an Environment Portfolio report snapshot for Region 0, Environment BRC at the Solutions Suite by Host level. FIG. 16c is an Environment Portfolio report snapshot for Region 0, Environment BRC at the Data level. FIG. 16d is an Environment Portfolio report snapshot for Region 0, Environment BRC at the Hardware level. FIG. 16e is a partial Environment Portfolio report snapshot for Region 0, Environment BRC at the Software by Host level. Finally, FIG. 17 is an exemplary server listing for the customer across the entire customer environment.

The analytics and reporting described above add value in numerous ways and to different entities for different reasons. By way of example, the Assignee of the present embodiments, TriZetto Corporation, provides software installations, upgrades and monitoring for numerous customers and for multiple software product suites. The data generated from the system and process of the present embodiments can be used by TriZetto customer IT teams to compare customer environments against best practices of TriZetto's development, deployment and hosting teams. The automated data generated by the system and process of the present embodiments increases accuracy and reduces collection time of actionable data from complex and distributed software environments. The automated data generated by the system and process of the present embodiments assures system quality from project inception through production support using periodic validations. Further, the automated data generation facilitated by the system and process of the present embodiments is extensible to include validations of custom and third-party applications.

The system and process of the present embodiments can be used during various stages of a software or software suite's lifetime. The embodiments are useful during upgrade planning, e.g., to review how the software is being used and evaluate impacts of new features. The embodiments are useful for initial build of a software system to compare hardware and software deployed against architecture and to validate software and integrations are properly configured. The embodiments are useful for patch releases and general maintenance to ensure patches are installed correctly and consistently and ensure code and configurations are deployed consistently. The embodiments are also useful for development, deployment and migration to ensure that custom code is installed correctly and consistently and that configurations are accurate for each environment.

Summarizing the audit features described above, the audit provides for a snapshot of servers at a point in time to confirm installed applications and version and configuration settings without collecting data particulars, e.g., personal health information (PHI). The audit feature also supports stand-alone validation, e.g., confirming customer environment matches defined architecture and validating environment specific configurations. The audit feature supports self-comparisons over time, e.g., identifying changes made between audits and determining if the differences were expected and approved. And, similarly, the audit feature also supports cross environment comparisons.

The functional review features described above and in the RUTA patent application Ser. No. 13/793,090 entitled "METHOD AND SYSTEM FOR RAPID UPGRADE THROUGH TRANSACTIONAL ANALYSIS," dictate how transactions need to be administered by the software to replicate customer usage thereof. The current customer system configuration and usage identifies customer specific functional and detailed design decisions through: SQL data extractions confirming current configuration and usage, accelerating the timeframe for identification and understanding of current system and usage patterns and highlighting distinct administrative decisions. In the context of the particular example herein wherein TriZetto Corporation software is being reviewed, such administrative decisions may include, but are not limited to billing type, rules configuration and payment options. Further the review does not use PHI or collect demographic data. Accordingly, the present embodiments may be implemented to review software systems which handle sensitive data, including health-related data.

One skilled in the art recognizes that although the disclosure has been shown and described with respect to one or more embodiments, equivalent alterations and modifications are anticipated upon a reading and understanding of this specification and the annexed drawings. The disclosure includes all such modifications and alterations and is limited only by the scope of the following claims.

The invention claimed is:

1. A process for performing a deployment assurance services audit of a customer environment to determine fitness for use, wherein the customer environment includes multiple servers each running at least one application and one or more databases, the process comprising:

receiving at a deployment assurance services (DAS) toolkit installed on an audit execution server that is separate from the customer environment, at least an expected server list for the customer environment;

executing, by the DAS toolkit installed on the audit execution server, a first set of multiple standard queries at a first time on each of the expected servers from the expected server list for the customer environment, wherein the multiple standard queries operate to confirm the existence of each of the expected servers and return first audit results data for at least one of hardware, software, registry, integration and configuration for each of the confirmed expected servers;

executing, by the DAS toolkit installed on the audit execution server, a second set of multiple standard queries at a second time on each of the expected servers from the expected server list for the computerized environment, wherein the multiple standard queries operate to confirm the existence of each of the expected servers and return second audit results data for at least one of hardware, software, registry, integration and configuration for each of the confirmed expected servers; and executing, by the DAS toolkit installed on the audit execution server, a technical validation comparison between one or more sets of first audit results data determined at the first time and one or more sets of second audit results data determined at the second time for one or more of the confirmed expected servers, wherein a validation output returns comparison audit results data that are different; and further wherein the validation output is used to determine the one or more confirmed expected server's fitness for the use.

2. The process according to claim 1, wherein one of the multiple standard queries is a registry query which includes an audit of a registry of each of the confirmed expected servers.

3. The process according to claim 1, wherein one of the multiple standard queries is an applications query which includes an audit of the installed applications including application name, publisher and version.

4. The process according to claim 1, wherein one of the multiple standard queries is a disk query which includes an audit of one or more disks associated with each of the confirmed expected servers.

5. The process according to claim 4, wherein the disk query is a Windows Management Instrumentation (WMI) query.

6. The process according to claim 5, wherein the WMI disk query returns the following information about the one or more disks: drive letter assigned, space allocated, space free, and space used.

7. The process according to claim 1, wherein one of the multiple standard queries is memory query which audits a total amount of memory of each of the confirmed expected servers.

8. The process according to claim 7, wherein the memory query is a Windows Management Instrumentation (WMI) query.

9. The process according to claim 1, wherein one of the multiple standard queries is a file-related query selected from the group consisting of a file existence query, a file count query and a file content query, and further wherein a file existence query scans disks for files and scans defined Network Attached Storage (NAS) paths to determine if a file is present in a specified NAS path;

a file count query scans disks for a count of files and scans defined Network Attached Storage (NAS) paths and returns a count of number of files in a specified path; and a file content query scans disks for files which match a specified content search criteria and scans defined Network Attached Storage (NAS) paths for all instances indicating a file in a defined NAS path and scans for specified search criteria.

10. The process according to claim 1, wherein one of the multiple standard queries is a services query which audits each confirmed expected server and returns a list of all services whose name matches the name specified.

11. The process according to claim 1, wherein one of the multiple standard queries is a database query which audits each confirmed expected server for database information including database name, allocated size, utilized size and collation settings.

12. The process according to claim 11, wherein the database query includes establishing a connection using an ODBC driver.

* * * * *